United States Patent
Roberts et al.

(10) Patent No.: US 8,472,808 B2
(45) Date of Patent: Jun. 25, 2013

(54) OPTICAL DATA PATH SYSTEMS

(75) Inventors: David A. Roberts, Ann Arbor, MI (US); Jichuan Chang, Sunnyvale, CA (US); Parthasarathy Ranganathan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 12/898,798

(22) Filed: Oct. 6, 2010

(65) Prior Publication Data
US 2012/0087674 A1 Apr. 12, 2012

(51) Int. Cl.
H04B 10/12 (2006.01)
H04J 14/02 (2006.01)
H04J 14/00 (2006.01)

(52) U.S. Cl.
USPC .................. 398/141; 398/49; 398/82

(58) Field of Classification Search
USPC ............... 398/45, 48, 49, 82, 83, 141
See application file for complete search history.

(56) References Cited

U.S. PATENT DOCUMENTS

| | | | |
|---|---|---|---|
| 6,332,050 B1 | 12/2001 | Feldman et al. | |
| 6,411,752 B1 * | 6/2002 | Little et al. | 385/17 |
| 7,505,822 B2 | 3/2009 | Vishkin | |
| 8,027,587 B1 * | 9/2011 | Watts | 398/79 |
| 2003/0128980 A1 * | 7/2003 | Abeles | 398/48 |
| 2004/0028357 A1 | 2/2004 | Pender | |
| 2008/0077731 A1 | 3/2008 | Forrest et al. | |
| 2008/0193133 A1 * | 8/2008 | Krug et al. | 398/83 |
| 2009/0216924 A1 | 8/2009 | Bennett | |

FOREIGN PATENT DOCUMENTS
WO 2009/055016 4/2009

OTHER PUBLICATIONS

Pan, Yan et al., "Firefly: Illuminating future Network-on-Chip with Nanophotonics", ISCA '09, Jun. 20-24, 2009, Austin, Texas.
Gu, Huaxi et al., "A Low-Power Fat Tree-based Optical Network-on-chip for Multiprocessor system-on-Chip", Intellevate (India) Pvt Ltd (3rd Site), Dec. 30, 2009.

* cited by examiner

*Primary Examiner* — Dalzid Singh

(57) ABSTRACT

This disclosure is directed to optical data path systems that enable unidirectional and bidirectional transmission of optical signals between nodes of a multi-node system such as a multiprocessor system. In one aspect, an optical data path system includes an optical device layer connected to nodes of a multi-node system and a controller. The optical device layer includes a waveguide network of waveguide branches optically connecting each node of the multi-node system to every other node of the multi-node system, resonators disposed adjacent to the waveguide branches, and detectors disposed adjacent to waveguide branches of the waveguide network. Each detector is electronically connected to a node of the multi-node system. The resonators are operated by the controller to control the path of optical signals sent between the nodes of the multi-node system.

20 Claims, 21 Drawing Sheets

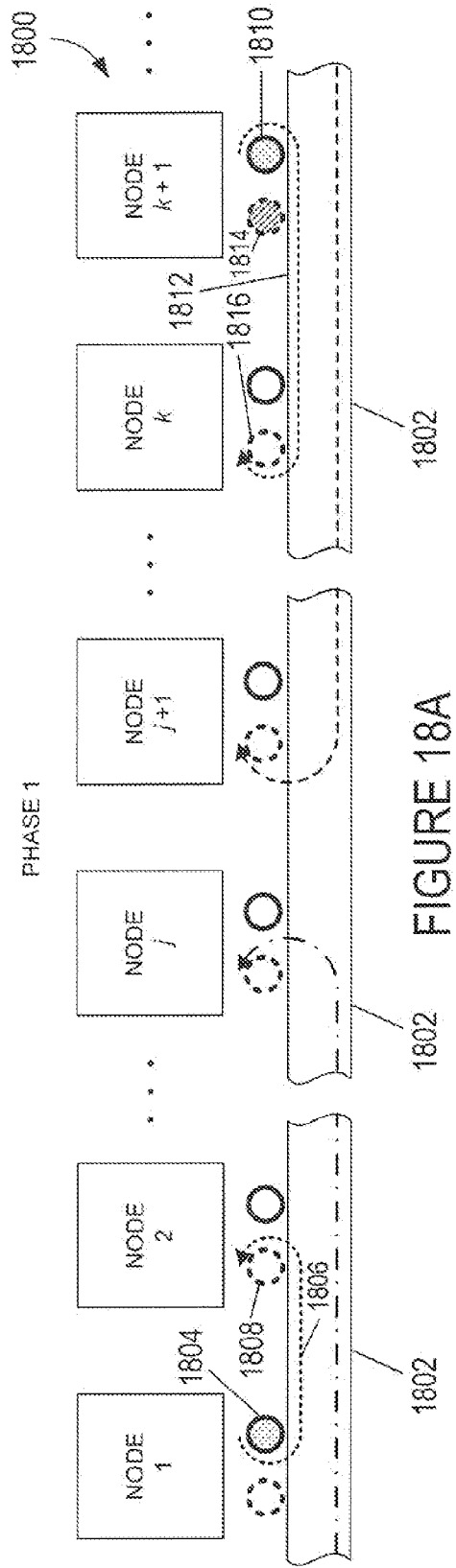
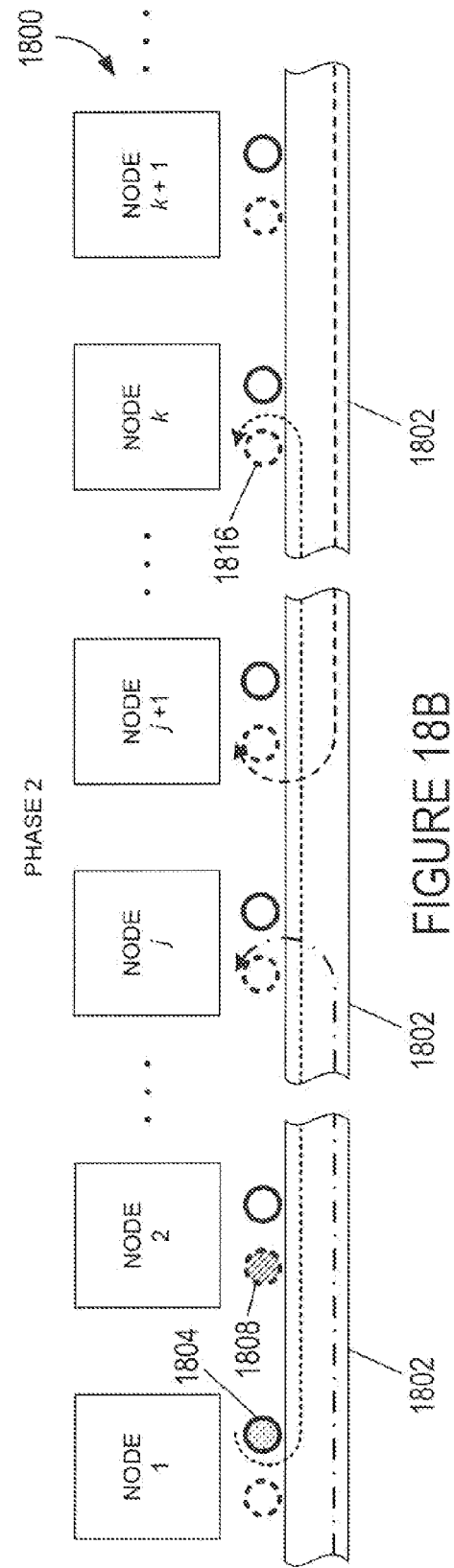
FIGURE 18A
FIGURE 18B

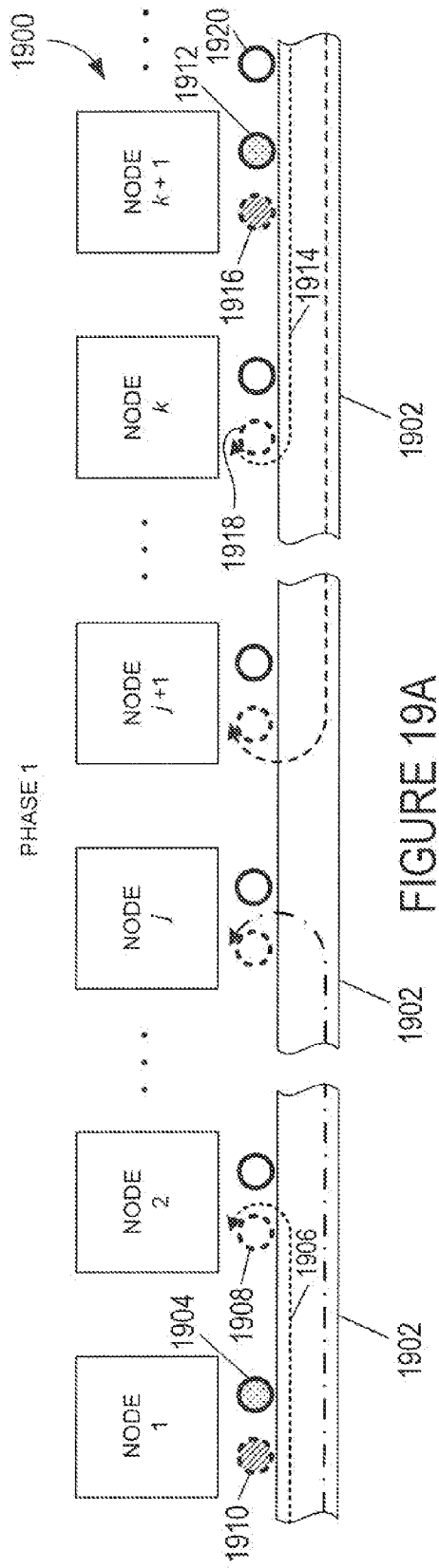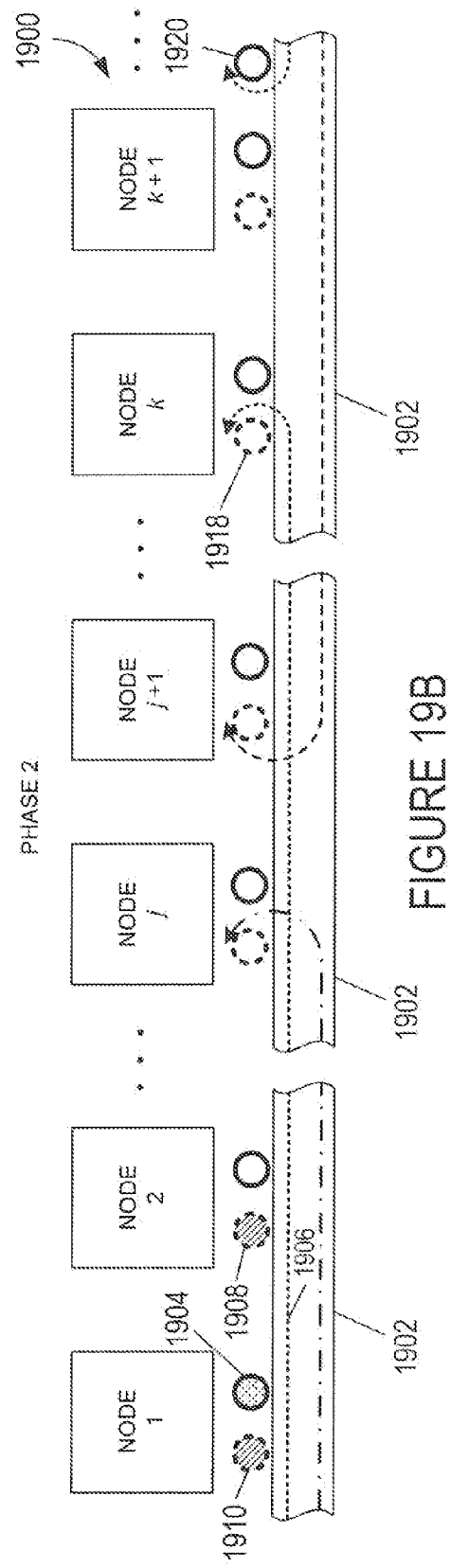

OPTICAL DATA PATH SYSTEMS

TECHNICAL FIELD

This disclosure relates to optical communication.

BACKGROUND

In recent years, trends in the microelectronic industry indicate that future multiprocessor chips may be composed of tens or even hundreds of nodes. A node can be a processing element, also called a core, and can refer to other electronic devices such as a cache, sensor, or memory. Typically, the nodes of a multiprocessor chip are integrated, share the same interconnects as the rest of the system, and each node processes and/or stores data independently. Multi-node chips packaged on a single die consume less power than the same nodes distributed in a different manner, such as on a circuit board. However, on-chip and off-chip communication between nodes of multi-node chips or across nodes on the same chip has emerged as an issue for sustaining performance growth and decreasing power consumption when processing computationally demanding, data-intensive applications. For example, computational bandwidth scales linearly with the growing number of data processing nodes, but the rate at which data can be communicated on-chip between nodes of a multi-node chip increases at a slower pace. In addition, the rate at which data can be communicated off-chip is also growing more slowly than compute bandwidth, and the energy cost of on-chip and off-chip communication significantly limits the achievable bandwidth. As a result, physicists and engineers continue to seek alternative systems for on-chip and off-chip, node-to-node communications.

BRIEF DESCRIPTION OF THE DRAWINGS

FIGS. 18A-18B show operation of an example optical device layer.

FIGS. 19A-19B show operation of an example optical device layer.

DETAILED DESCRIPTION

This disclosure is directed to optical data path systems that enable unidirectional and bidirectional transmission of optical signals between nodes of a multi-node system. A multi-node system can be a multi-node chip where the term "node" refers to processing elements, cache, and/or memory. A multi-node system can also refer to larger computational systems, where the term "node" refers to other computation devices such as a multiprocessor chip, a server, a server array, or can even refer to computing systems at the scale of a room or building. The optical data path systems include at least one optical device layer composed of microring resonators, microring detectors, and a waveguide network. The optical data path systems enable the implementation of various data partitioning schemes by providing control over the manner in which data encoded in optical signals is distributed between nodes. The detailed description is organized with microring resonators and microring detectors described in a first subsection. Various examples of optical data path systems are described in a subsequent subsection.

In the following description of example optical data path systems, the term "optical" relates to electromagnetic radiation in the visible and the non-visible portions of the electromagnetic spectrum. The optical data path systems transmit optical signals that encode information in high and low amplitude states or phase changes of a channel of electromagnetic radiation. The term "channel" refers to a wavelength of electromagnetic radiation or a narrow band of electromagnetic radiation centered about a particular wavelength. For example, an optical signal can be composed of high amplitude portions that represent logic bit value "1" and low amplitude portions that represent logic bit value "0," or vice versa.

Microring Resonators and Microring Detectors

Figure 1:
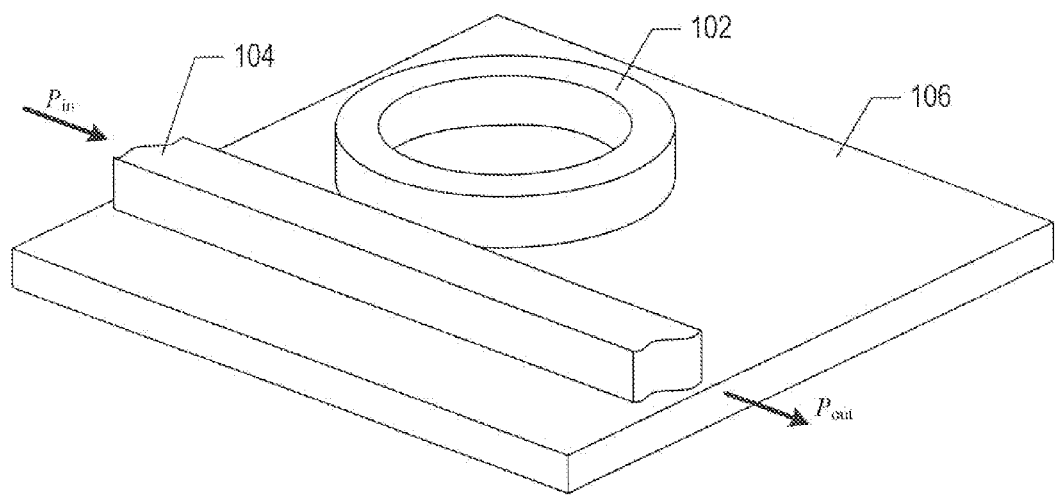
FIG. 1 shows an isometric view of an example microring resonator and a portion of an adjacent ridge waveguide.

Microring resonators ("resonators") and ridge waveguides are disposed on a substrate. FIG. 1 shows an isometric view and enlargement of an example resonator 102 and a portion of an adjacent ridge waveguide 104 disposed on the surface of a substrate 106. The resonator 102 and waveguide 104 are typically composed of a material having a relatively higher refractive index than the substrate 106. For example, resonators and waveguides can be composed of silicon ("Si") and the substrate can be composed of $SiO_2$ or another suitable lower refractive index material. The resonators and waveguides can have an air cladding or can be covered by a lower refractive index material that serves as a cladding layer. The resonators and waveguides can be formed by first depositing a layer of higher refractive index material on lower refractive index material that serves as the substrate. The resonators and waveguides can be formed in the higher refractive index material using various lithographic and/or etching techniques. For example, the resonators and waveguides can be formed using nanoimprint lithography or reactive ion etching.

A channel transmitted along the waveguide 104 is evanescently coupled from the waveguide 104 into the resonator 102 when the channel and the dimensions of the resonator 102 satisfy the resonance condition:

$$\frac{L}{m} \approx \frac{\lambda}{n_{eff}(\lambda, T)}$$

where $n_{eff}$ is the effective refractive index of the resonator 102, L is the effective optical path length of the resonator 102, m is an integer indicating the order of the resonance, T is temperature, and $\lambda$ is the free-space wavelength of the channel traveling in the waveguide 104. The resonance condition can also be rewritten as $\lambda \approx Ln_{eff}(\lambda,T)/m$. In other words, the resonance wavelength for a resonator is a function of the resonator effective refractive index $n_{eff}$ optical path length L.

Evanescent coupling is the process by which evanescent waves of light are transmitted from one medium, such as a resonator, to another medium, such a ridge waveguide, and vice versa. The term "light" refers to electromagnetic radiation with wavelengths in the visible and non-visible portions of the electromagnetic spectrum. For example, suppose the resonator 102 is configured to support the modes of the light propagating in the waveguide 104 in accordance with the resonance condition. Evanescent coupling between the resonator 102 and the waveguide 104 can occur when the evanescent field generated by the light propagating in the waveguide 104 couples into the resonator 102. The evanescent field gives rise to light that propagates in the resonator 102, thereby evanescently coupling the light or channel from the waveguide 104 into the resonator 102.

Figure 2:
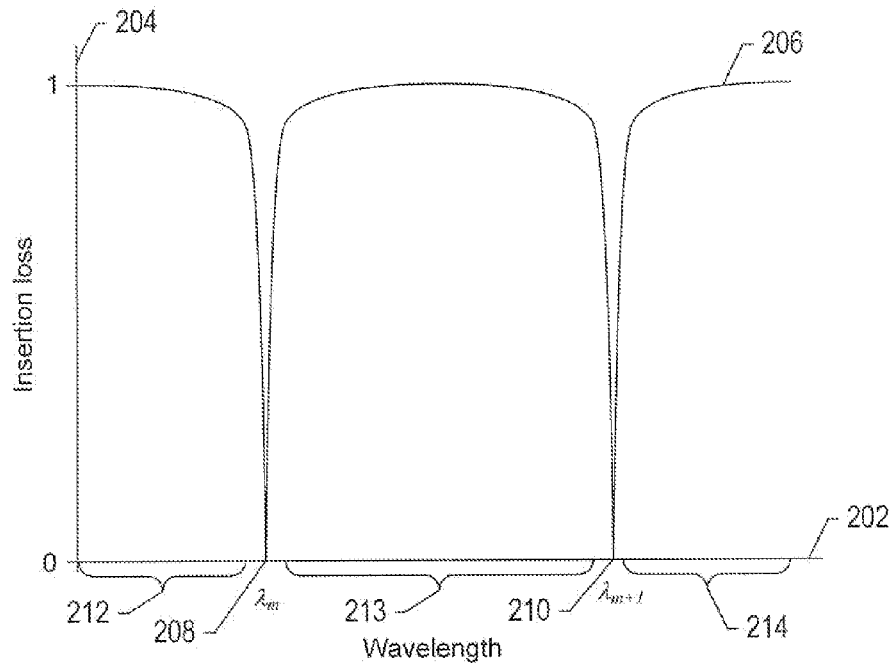
FIG. 2 shows an example plot of insertion loss versus wavelength for a microring resonator and a waveguide.

FIG. 2 shows an example plot of insertion loss versus wavelength for the resonator 102 and the waveguide 104 shown in FIG. 1. Insertion loss, also called attenuation, is the loss of optical power associated with a wavelength of light traveling in the waveguide 104 coupling into the resonator 102 and can be expressed as $10 \log_{10}(P_{in}/P_{out})$ in decibels ("dB"), where $P_{in}$ represents the optical power of light traveling in the waveguide 104 prior to reaching the resonator 102, and $P_{out}$ is the optical power of light that passes the resonator 102. In FIG. 2, horizontal axis 202 represents wavelength, vertical axis 204 represents insertion loss, and curve 206 represents the insertion loss of light associated with a channel passing the resonator 102 over a range of wavelengths. Minima 208 and 210 of the insertion loss curve 206 correspond to wavelengths $\lambda_m = Ln_{eff}/m$ and $\lambda_{m+1} = Ln_{eff}/(m+1)$, respectively. These wavelengths represent only two of many regularly spaced minima. Wavelengths of light satisfying the resonance condition above are said to have "resonance" with the resonator 102 and are evanescently coupled from the waveguide 104 into the resonator 102. In the narrow wavelength regions surrounding the wavelengths $\lambda_m$ and $\lambda_{m+1}$, the insertion loss curve 206 reveals a decrease in the insertion loss the farther wavelengths are away from the wavelengths $\lambda_m$ and $\lambda_{m+1}$. In other words, the strength of the resonance between the resonator 102 and light traveling in the waveguide 104 decreases the farther the wavelengths are away from $\lambda_m$ and $\lambda_{m+1}$, and thus, the amount of the light coupled from the waveguide 104 into the resonator 102 decreases the farther the wavelengths are away from $\lambda_m$ and $\lambda_{m+1}$. Light with wavelengths in the regions 212-214 pass the resonator 102 substantially undisturbed.

According to the resonance condition, because the resonance wavelength $\lambda$ is a function of the optical path length L and the effective refractive index $n_{eff}$, changing the effective refractive index and/or the optical path length produces a corresponding change in the resonance wavelength of the resonator. The resonator's effective refractive index and the optical path length L can be changed by varying the resonator's temperature (i.e., thermal tuning). For thermal tuning, the resonance wavelength shift can be expressed as:

$$\Delta\lambda \approx \lambda \frac{\Delta n_{eff} \Delta L}{n_{eff} L}$$

where $\Delta n_{eff}$ is the change in the effective refractive index of the material comprising the resonator, and $\Delta L$ is the change in the optical path length of the resonator.

In addition, resonators can be, composed of semiconductor materials that exhibit electro-optic behavior. The effective refractive index of an electro-optic material is changed when an electric field is applied to or charge carriers are injected into the material. Thus, the resonance wavelength of a resonator can be electronically tuned by injecting current into the resonator (i.e., current tuning) or by applying a voltage to the resonator (i.e., electro-optic tuning). For electronic tuning, the resonance wavelength shift can be expressed as:

$$\Delta\lambda \approx \lambda \frac{\Delta n_{eff}}{n_{eff}}$$

Figure 3:
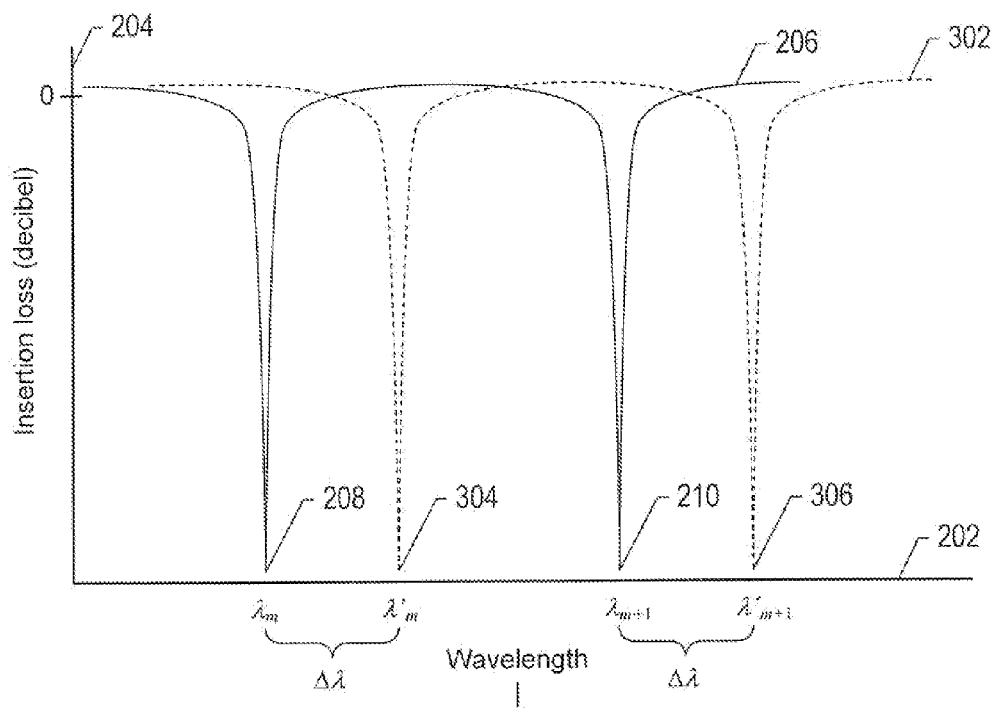
FIG. 3 shows an example plot of insertion loss versus wavelength for a microring resonator and a waveguide where the resonance wavelength of the microring resonator is shifted.

FIG. 3 shows a plot of insertion loss versus wavelength represented by dashed-line curve 302 for the resonator 102 and the waveguide 104, where the effective refractive index and/or the optical path length L are changed as a result of temperature tuning or electronic tuning. Shifting the resonance wavelength of the resonator 102 by $\Delta\lambda$ shifts the insertion loss minima 208 and 210 associated with the wavelengths $\lambda_m$ and $\lambda_{m+1}$ to insertion loss minima 304 and 306 associated with the wavelengths $\lambda'_m$ and $\lambda'_{m+1}$. Comparing curve 302 with curve 206 reveals that when the resonant 102 is shifted into the resonance condition represented by the curve 302, light with the wavelengths $\lambda_m$ and $\lambda_{m+1}$ is no longer evanescently coupled from the waveguide 104 into the resonator 102, but light with wavelengths $\lambda'_m$ and $\lambda'_{m+1}$ is evanescently coupled from the waveguide 304 into the resonator 102.

Figure 4:
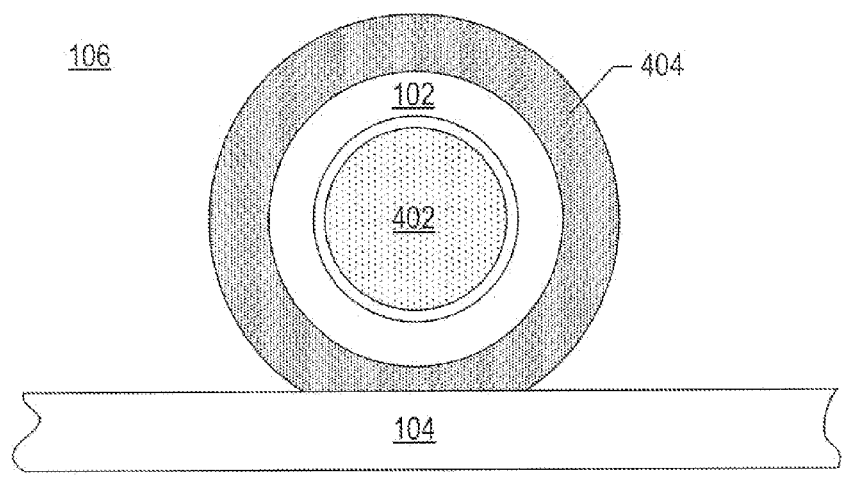
FIG. 4 shows an example schematic representation and top view of doped regions surrounding a microring resonator and waveguide.

The resonator 102 can be thermally tuned by applying heat to the region surrounding the resonator 102. For example, a heating element can disposed on the substrate surrounding a portion of the resonator 102 and resistance heating can be used to thermally tune the resonator 102. The resonator 102 can be electronically tuned by doping regions of the substrate 106 surrounding the resonator 102 with appropriate electron donor and electron acceptor atoms or impurities. FIG. 4 shows a schematic representation and top view of doped regions surrounding the resonator 102 and the ridge waveguide 104. In certain embodiments, the resonator 102 comprises an intrinsic semiconductor. A p-type semiconductor region 402 can be formed in the semiconductor substrate interior of the resonator 102, and an n-type semiconductor 404 can be formed in the semiconductor substrate 106 surrounding the outside of the resonator 102. The p-type region 402 and the n-type regions 404 form a p-i-n junction around the resonator 102. In other embodiments, the dopants can be reversed in order to form an n-type semiconductor region 402 in the substrate interior of the resonator 102 and a p-type semiconductor region 404 in the substrate surrounding the outside of the resonator 102.

A thermally or electronically tunable resonator can be configured to evanescently couple or divert light from an adjacent waveguide when an appropriate voltage is applied to the region surrounding the resonator. For example, the electronic controlled resonator 102, shown in FIG. 4, can be configured with a path length L and an effective refractive index $n_{eff}'$ such that an optical signal with a wavelength $\lambda$ propagating along the waveguide 104 does not satisfy the resonance condition:

$$n'_{eff} L \neq m\lambda$$

The optical signal passes the resonator 102 undisturbed and the resonator 102 is said to be turned "off." On the other hand, when an appropriate voltage is applied to the resonator 102, the effective refractive index $n_{eff}'$ shifts to the refractive value $n_{eff}$ and the optical signal satisfies the resonance condition:

$$n_{eff} L = m\lambda$$

As a result, the optical signal is coupled from the waveguide 104 into the resonator 102 and the resonator 102 is said to be turned "on." When the voltage is subsequently turned "off," the effective refractive index of the resonator 102 shifts back to $n_{eff}'$ and the same optical signal propagates along the waveguide 104 undisturbed.

Figure 5:
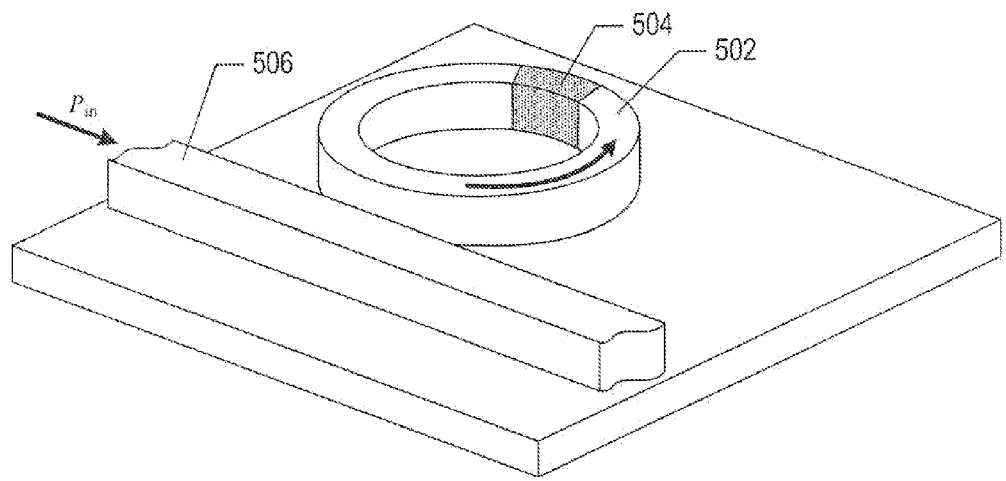
FIG. 5 shows an example of microring resonator with a doped detector region.
Figure 6:
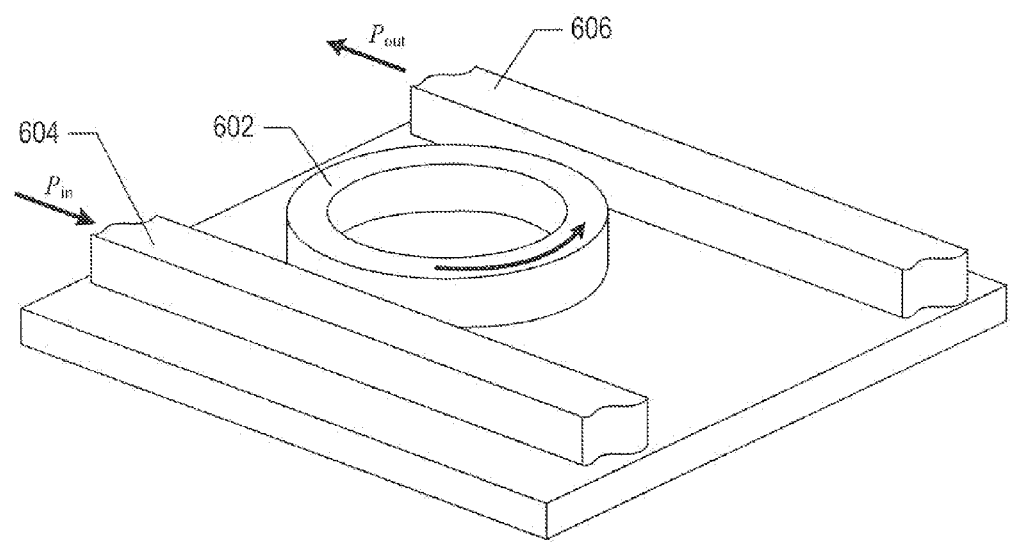
FIG. 6 shows an example of a microring resonator that couples an optical signal from a first waveguide into a second waveguide.

Because of the evanescent coupling properties of resonators, resonators can also be used to detect particular optical signals transmitted along an adjacent waveguide, or resonators can be used to couple optical signals of a particular wavelength from one adjacent waveguide into another adjacent waveguide. FIG. 5 shows an example of the resonator 502 with a doped detector region 504 embedded within a portion of the resonator 502. The detector portion 504 can be a SiGe doped region of the resonator 502. The resonator 502 and doped detector region 504 in combination form a detector. For example, an optical signal having a wavelength that is resonant with the resonator 502 is evanescently coupled from the waveguide 506 into the resonator 502 and remains trapped for a period of time while circulating within the resonator 502. The detector portion 504 converts the optical signal into an electronic signal that can be transmitted over a signal line to an electronically coupled node or device. FIG. 6 shows a resonator 602 used to couple an optical signal from a first waveguide 604 into a second waveguide. An optical signal having a wavelength that is resonant with the resonator 602 is evanescently coupled from the first waveguide 604 into the resonator 602 where the optical signal circulates within the resonator 602 and is evanescently coupled into the second waveguide 606. Note that the optical signal is transmitted along the first waveguide 604 in one direction and the optical signal coupled into the second waveguide 606 is transmitted in the opposite direction.

Optical Data Path Systems

Figure 7A:
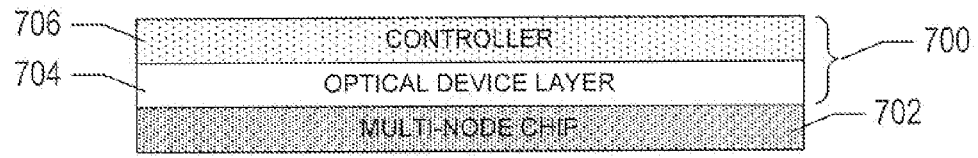
FIG. 7A-7B show a side view and an exploded isometric view of an example optical data path system including one optical device layer disposed on a multi-node system.
Figure 7B:
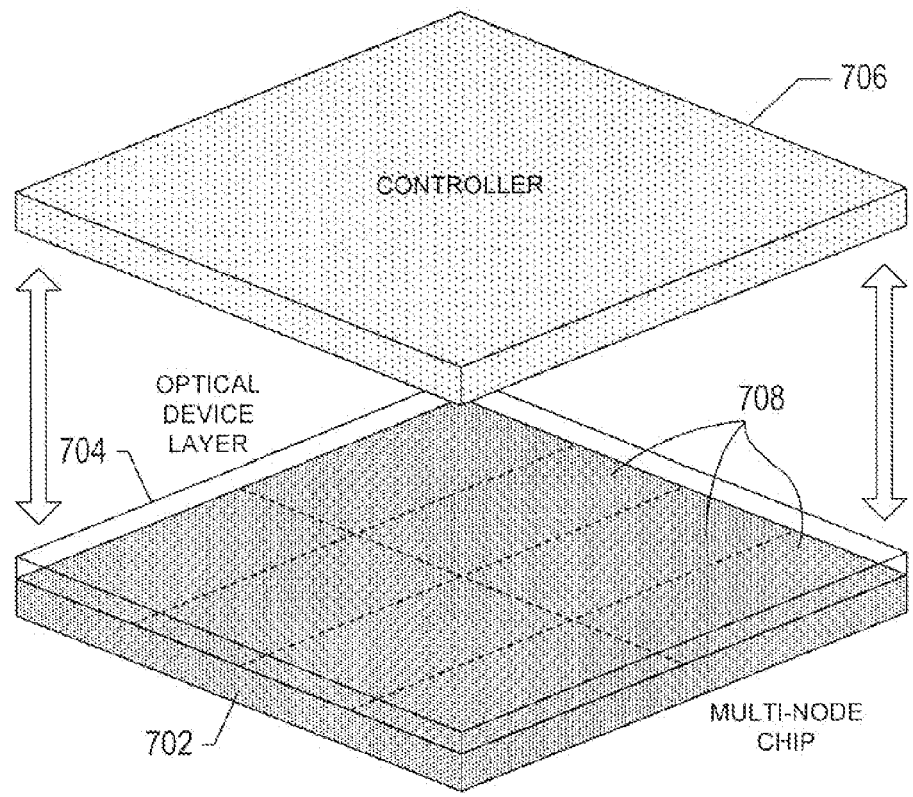

FIG. 7A shows a side view of an example optical data path system 700 disposed on a multi-node chip 702. The system 700 includes an optical device layer 704 disposed on the chip 702 and a controller 706 disposed on the optical device layer 704. FIG. 7B shows an exploded isometric view of the system 700 where the chip 702 includes eight nodes 708. Each node can be a processing element, such as a core, or a sensor or memory. For example, the chip 702 can represent a multi-core processor chip where each node is composed of a core and associated cache memory, or the chip 702 can represent memory where each node represents a DRAM memory region. The optical device layer 704 includes resonators, detectors, and a waveguide network not shown in FIG. 7B. Examples of various resonator, detector, and waveguide network configurations are described below with reference to FIGS. 9-18. The optical device layer 704 enables data encoded in optical signals to be transmitted between the nodes. The transmission of optical signals between nodes is managed by the controller 706.

Figure 8:
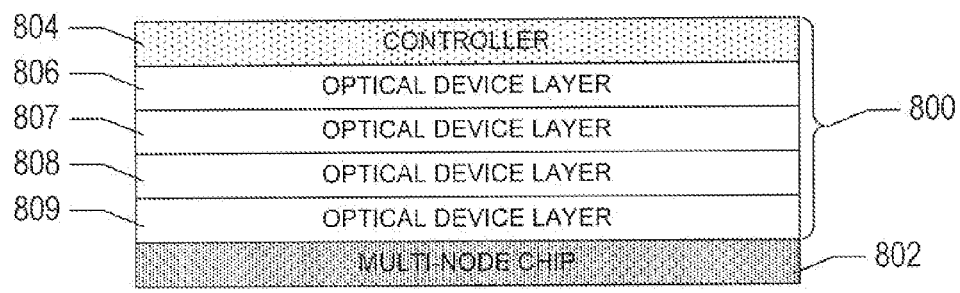
FIG. 8 shows an example optical data path system including four stacked optical device layers disposed on a multi-node system.

The optical data path system can be operated with a single optical device layer that enables optical signals to be transmitted between nodes, as shown in FIG. 7A, or with a number of separate optical device layers where each optical device layer enables at least one node to send optical signals to the other nodes in the multi-node chip. FIG. 8 shows an example optical data path system 800 disposed on a multi-node chip 802. The system 800 includes a controller 804 and four stacked optical device layers 806-809 where each optical device layer includes resonators, detectors, and a waveguide network that enables one of four nodes comprising the chip 802 to send optical signals to at least three other nodes. Example of various optical device layers 806-809 are now described with reference to FIGS. 9-10.

Note that the controllers 706 and 804 are shown in the example optical data path systems 700 and 800 as being implemented in separate layers form the optical device layers and the chip layer. However, in practice the controller can be integrated into the chip 702. In other words, in the example chip 702, the controller layers 700 and 800 can be omitted and the operations performed by the controllers can be integrated in the chip 702.

Figure 9A:
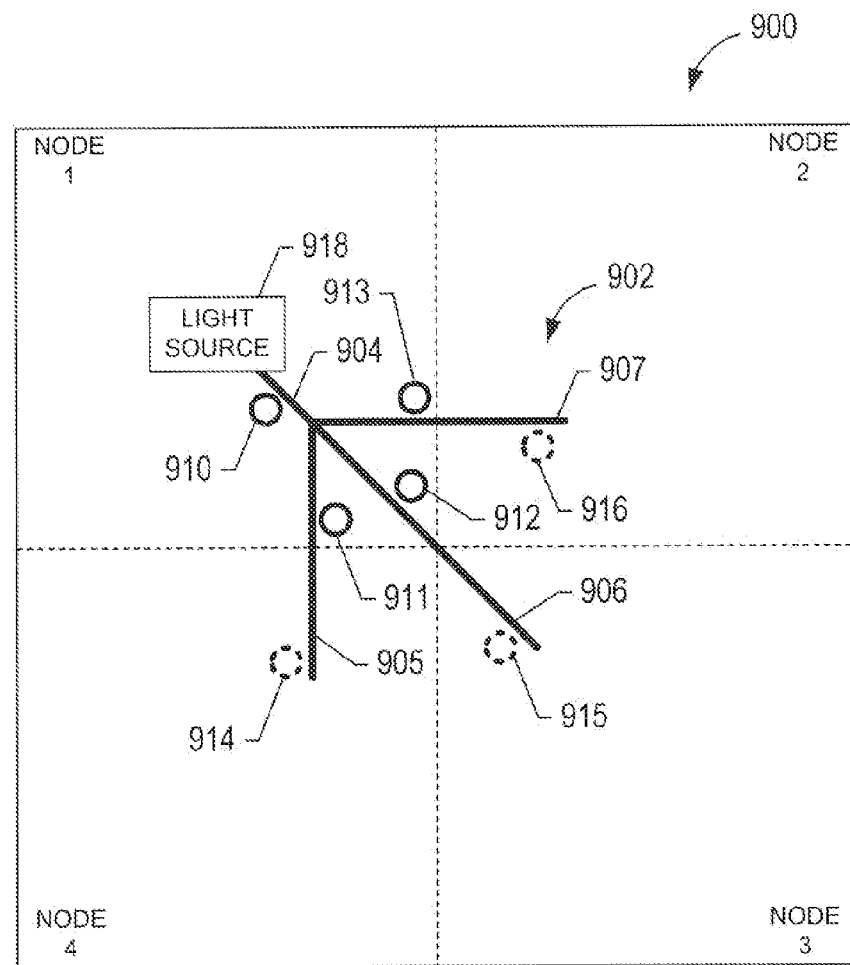
FIGS. 9A-9B show a top-plan view and operation of an example optical device layer of an optical data, path system.

FIG. 9A shows a top-plan view of an example optical device layer 900 of the system 800. In the example of FIG. 9A, the optical device layer 900 includes a waveguide network 902 composed of a root waveguide 904 and three waveguide branches 905-907. The waveguides 904-907 form a network of waveguide branches that optically connect node 1 to nodes 2-4. The optical device layer 900 also includes resonators 910-913 located along the waveguides 904-907, respectively, and detectors 914-916 located near the ends of the waveguides 905-907, respectively. The optical device layer 900 may also include a light source 918, such as a semiconductor laser or light-emitting diode, that generates an unmodulated channel injected into the root waveguide 904. In other examples, the light source 918 can be omitted and the channel generated by an off-chip light source that injects the channel into the root waveguide 904 from an optically coupled optical fiber or other off-chip waveguide. The optical device layer 900 is configured so that node 1 can selectively send optical signals to at least one of the nodes 2-4. The resonator 910 is electronically tunable and operated by electronically connected node 1 to encode data generated by sending node 1 in the channel generated by the light source 918. The detectors 914-916 are electronically connected to corresponding nodes and are resonant with the channel generated by the light source 918. Resonators 911-913 can be electronically or thermally tunable to prevent certain detectors 914-916 from unintentionally receiving the optical signal generated by node 1. In certain examples, the resonators 911-913 can be electronically connected to and operated by node 1 or the resonators 911-913 can be electronically connected to and operated by a controller (not shown).

Figure 9B:
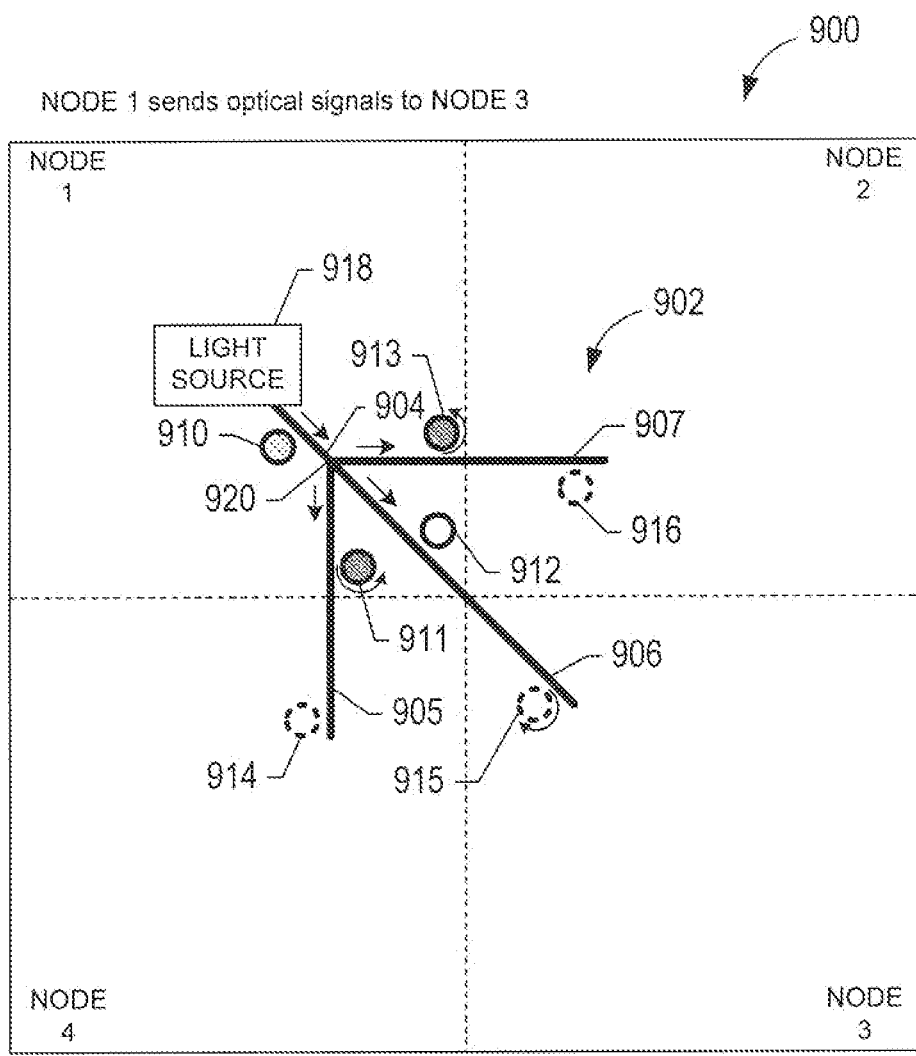

FIG. 9B shows a top-plan view of the optical device layer 900 operated so that sending node 1 can exclusively send optical signals to a receiving node 3 and prevent the optical signals from reaching non-receiving nodes 2 and 4. The light source 918 generates an unmodulated channel injected into the waveguide 904. Node 1 operates the resonator 910 to modulate the channel and generate an optical signal. For example, node 1 generates an electronic signal comprising high and low voltages that is applied to the resonator 910. A high voltage generated by node 1 can represent a logic bit value "1" and a low or no voltage generated by node 1 can represent a logic bit value "0," or vice versa. The resonator 910 can be configured and operated so that while a high voltage is applied to the resonator 910, the resonator 910 is resonant with the wavelength of the channel and the channel is evanescently coupled from the waveguide 904 into the resonator 910. While a low or no voltage is applied in applied to the resonator 910, the resonator 910 is switched off resonance with the channel and the channel passes the resonator 910 unperturbed. In this example, each high amplitude portion of the optical signal corresponds to a low voltage portion of the electronic signal, and each low amplitude portion of the optical signal corresponds to a high voltage portion of the electronic signal. A low or no amplitude portion of the optical signal can represent a logic bit value "1" and a high amplitude portion of the optical signal can represent a logic bit value "0," or vice versa. The waveguide network 902 is configured so that when the optical signal carried by the waveguide 904 reaches branch point 920, the optical signal is split and enters each of the waveguides 905-907 with approximately equal optical power. As shown in the example of FIG. 9B, because the data encoded in the optical signal is intended for node 3, resonators 911 and 913 are turned "on" in order to extract the optical signals carried by the waveguides 905 and 907 via evanescent coupling and prevent the optical signals from reaching the detectors 914 and 916, respectively. While the resonators 911 and 913 are turned "on" the resonator 912 is turned "off" enabling the optical signal carried by the waveguide 906 to pass the resonator 912 and be extracted by the detector 915 where the optical signal is converted into an electronic signal that can be processed by node 3.

Note that in other optical device layer examples, direct modulation can be used to generate the optical signal. For example, the resonator 910 can be omitted and the power supplied to the light source 918 can be modulated by node 1 to encode data in an optical signal injected into the waveguide 904.

Figure 10A:
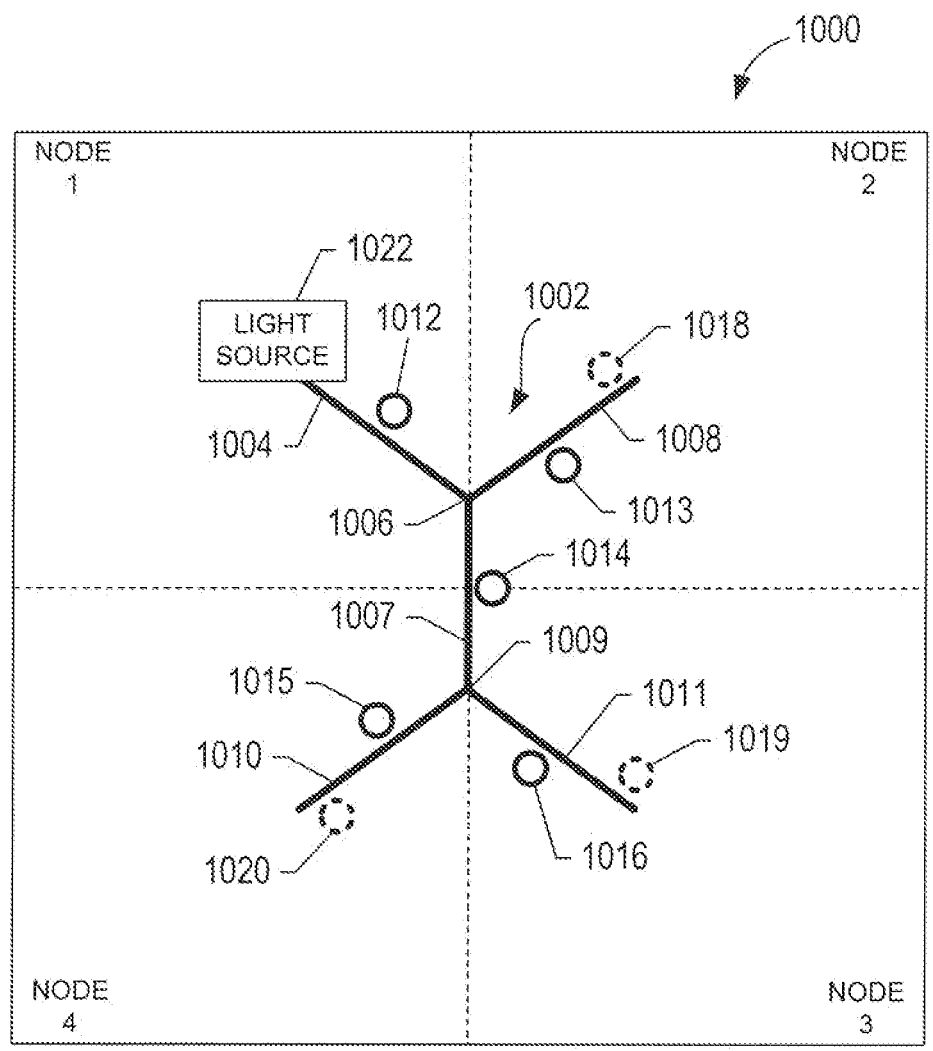
FIGS. 10A-10B show a top-plan view and operation of an example optical device layer of an optical data path system.

Optical device layers include other possible waveguide network configurations for distributing optical signals from one node to other nodes. FIG. 10A shows a top-plan view of an example optical device layer 1000 of the system 800. The optical device layer 1000 includes a waveguide network 1002 with a binary tree configuration. In particular, the waveguide network 1002 includes a root waveguide 1004 that branches at branch point 1006 into waveguides 1007 and 1008 and waveguide 1007 branches at branch point 1009 into waveguides 1010 and 1011. The waveguides 1004, 1007, 1008, 1010, and 1011 form a network of waveguide branches that optically connect the nodes 1-4. The optical device layer 1000 includes resonators 1012-1016 located adjacent to the waveguides 1004-1011, respectively, and detectors 1018-1020 located near the ends of the waveguides 1008, 1010, and 1011, respectively. The optical device layer 1000 may also include a light source 1022 that injects a channel into the root waveguide 1004. In other examples, the light source 1022 can be omitted and the channel is generated by an off-chip light source and injected into the waveguide 1004. Like the optical device layer 900, the layer 1000 is also configured so that data generated by node 1 can be selectively sent to at least one of the nodes 2-4. The resonator 1012 is electronically tunable and operated by electronically connected node 1 to encode data generated by node 1 in an unmodulated channel generated by the light source 1022. The detectors 1018-1020 are electronically connected to corresponding nodes 2-4 and are resonant with the channel generated by the light source 1022. Resonators 1013-1016 are electronically or thermally tuned to prevent certain detectors 1018-1019 from unintentionally receiving the optical signal generated by node 1.

Figure 10B:
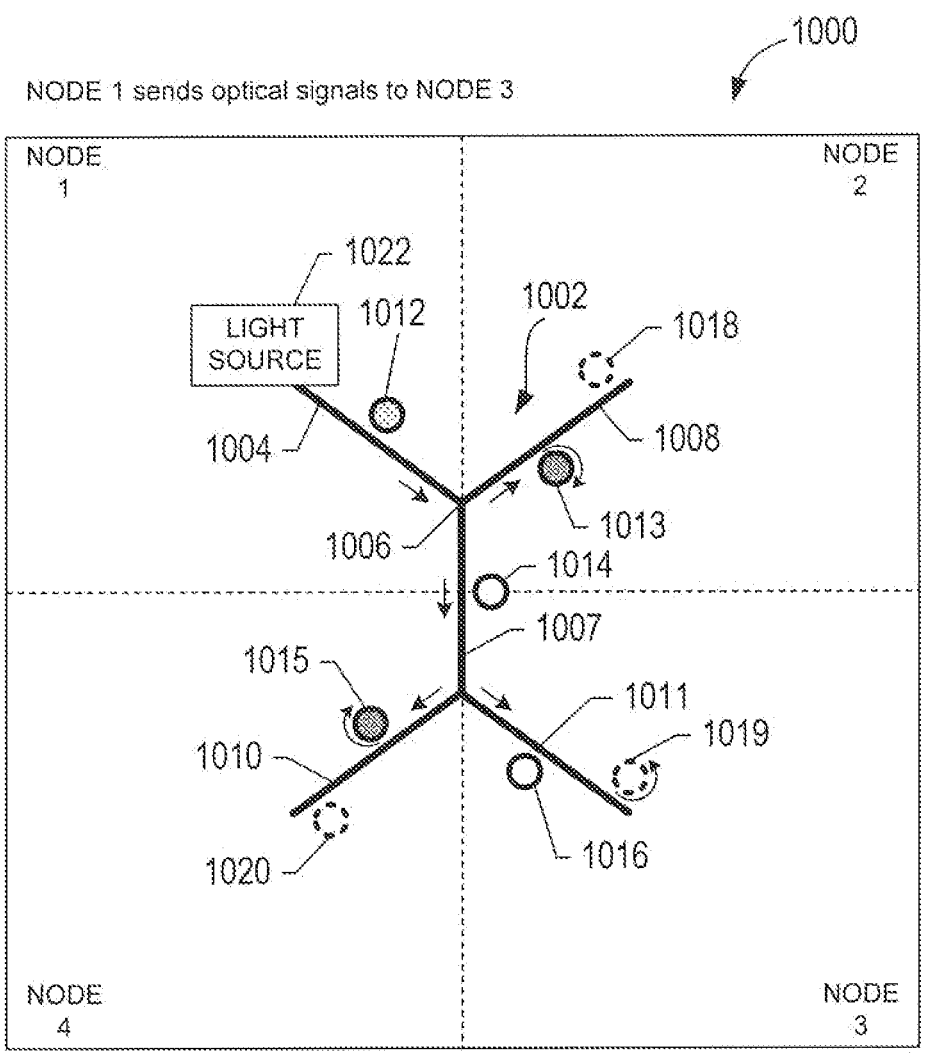

FIG. 10B shows a top-plan view of the optical device layer 1000 operated so that sending node 1 can exclusively send optical signals to receiving node 3 and prevent the optical signals from reaching non-receiving nodes 2 and 4. The light source 1022 generates a channel that is injected into the waveguide 1004. Node 1 operates the resonator 1012 to modulate the channel and generate an optical signal, as described above with reference to FIG. 9B. When the optical signal carried by the waveguide 1004 reaches branch point 1006, the optical signal is split and enters the waveguides 1007 and 1008 with approximately equal optical power. The resonator 1014 is turned "off" to permit the optical signal to reach the branch point 1009 where the optical signal is again split entering corresponding waveguides 1010 and 1011 with approximately equal optical power. On the other hand, because the data encoded in the optical signal is intended for node 3, resonators 1013 and 1015 are turned "on" to extract the optical signals carried by the waveguides 1008 and 1010 via evanescent coupling and prevent the optical signal from reaching the detectors 1018 and 1020.

Note that in other optical device layer examples, direct modulation of the light source can be used to generate the optical signal. For example, the resonator 1012 can be omitted and the power supplied to the light source 1022 can be modulated by node 1 to encode data in an optical signal injected into the waveguide 1004.

Figure 11A:
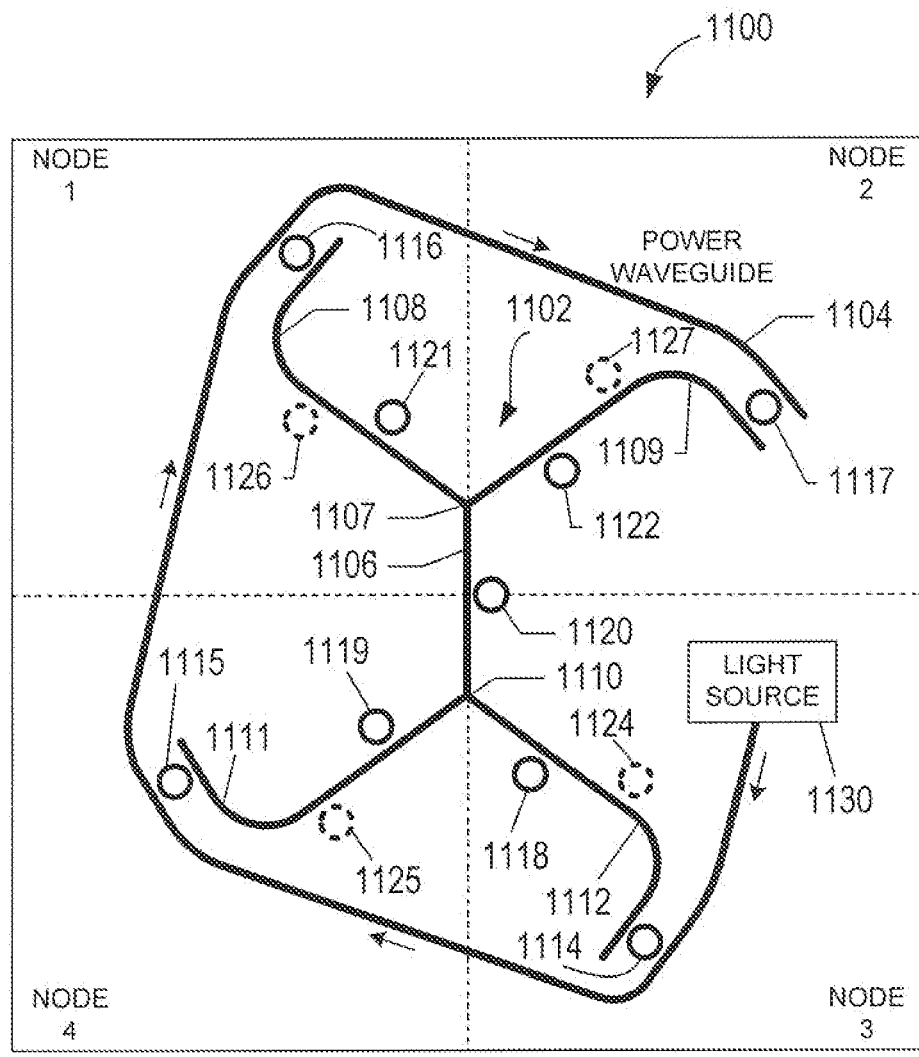
FIGS. 11A-11B show a top-plan view and operation of an example optical device layer.

Returning to FIG. 7A, the single optical device layer 704 can be configured so each node can, when permitted, use the optical device layer 704 to send optical signals to at least one of the other nodes in the chip 702. This can be accomplished by configuring the controller 706 to implement an arbitration scheme that allows each node exclusive access to the waveguide network of the optical device layer for a period of time. FIG. 11A shows an example optical device layer 1100 that can be implemented in the system 700. The optical device layer 1100 includes a waveguide network 1102 and a power waveguide 1104. In the example of FIG. 11A, the waveguide network 1102 includes a central waveguide 1106 that branches at a first branch point 1107 into waveguides 1108 and 1109 and branches at a second branch point 1110 into waveguides 1111 and 1112. The optical device layer 1100 includes resonators 1114-1122 and detectors 1124-1127. The optical device layer 1100 may also include a light source 1130 that injects a channel into the power waveguide 1104. In other examples, the light source 1130 can be omitted and the channel is generated by an off-chip light source and injected into the power waveguide 1104. The resonators 1114-1117 are each electronically connected to one of the nodes and are used by the electronically connected node to encode data in the channel traveling in the power waveguide 1104. The detectors 1124-1127 are also each electronically connected to one of the nodes. For example, resonator 1114 and detector 1124 are electronically connected to node 3. The resonators 1118-1122 and the detectors 1124-1127 are turned "on" and "off" resonance with the channel by the controller 706 (not shown in FIG. 11A) in order to control which node(s) receive optical signals from a sending node.

Figure 11B:
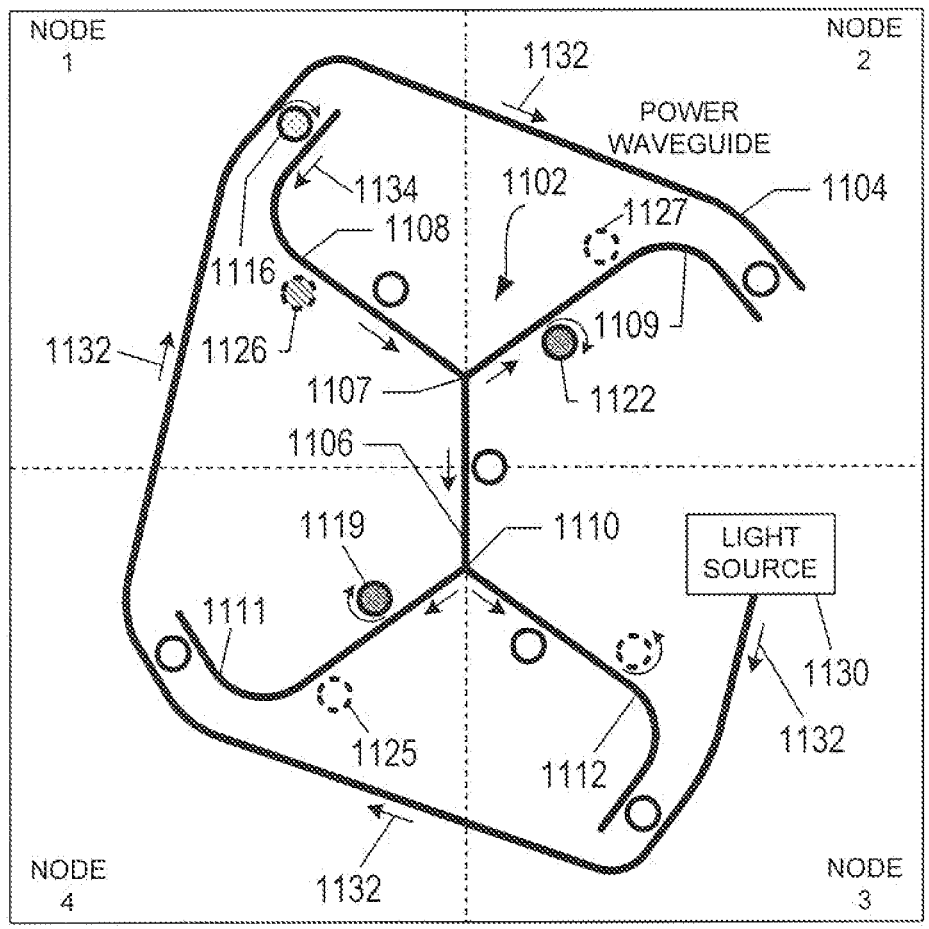

FIG. 11B shows a top-plan view of the optical device layer 1100 operated so that sending node 1 can exclusively send optical signals to receiving node 3 and prevent the optical signals from reaching non-receiving nodes 2 and 4. The light source 1130 generates a single channel that traverses the power waveguide 1104 in a clockwise direction, as indicated by directional arrows 1132. When node 1 is granted use of the optical device layer via arbitration, node 1 operates the resonator 1116 to modulate the channel and generate an optical signal that traverses the waveguide 1108 in the direction 1134. For example, node 1 generates an electronic signal comprising high and low voltages applied to the resonator 1116. A high voltage generated by node 1 can represent a logic bit value "1" and a low or no voltage generated by node 1 can represent a logic bit value "0," or vice versa. When a high voltage is applied to the resonator 1116, the resonator 1116 is resonant with the channel and the channel is evanescently coupled from the power waveguide 1104 into the resonator 1116 and from the resonator 1116 into the waveguide 1108. While a low or no voltage is applied to the resonator 1116, the resonator 1116 is switched off resonance with the channel and the channel passes the resonator 1116 unperturbed. In this example, each high amplitude portion of the optical signal carried by the waveguide 1108 corresponds to a low voltage portion of the electronic signal, and each low amplitude portion of the optical signal carried by the waveguide 1108 corresponds to a high voltage portion of the electronic signal. A low or no amplitude portion of the optical signal can represent a logic bit value "0" and a high amplitude portion of the optical signal can represent a logic bit value "1," or vice versa. Because the optical signal is intended for node 3, the detector 1126 is switched off resonance with the channel using either electronic or thermal tuning to permit the optical signal to pass the detector 1126 unperturbed. When the optical signal reaches branch point 1107, the optical signal is split and enters waveguides 1106 and 1109 with approximately equal optical power. The optical signal carried by waveguide 1106 is spit at branch point 1110 and enters waveguides 1111 and 1112. The resonators 1119 and 1122 are switched "on" resonance with the channel in order to extract the optical signal from the waveguides 1111 and 1109, respectively, and prevent the optical signals from reaching detectors 1125 and 1127. The resonators 1118, 1120, are 1121 are turned "off" resonance with the channel in order to permit the optical signal to reach the detector 1124 where the optical signal is extracted and converted into an electronic signal for processing by node 3.

Figure 12A:
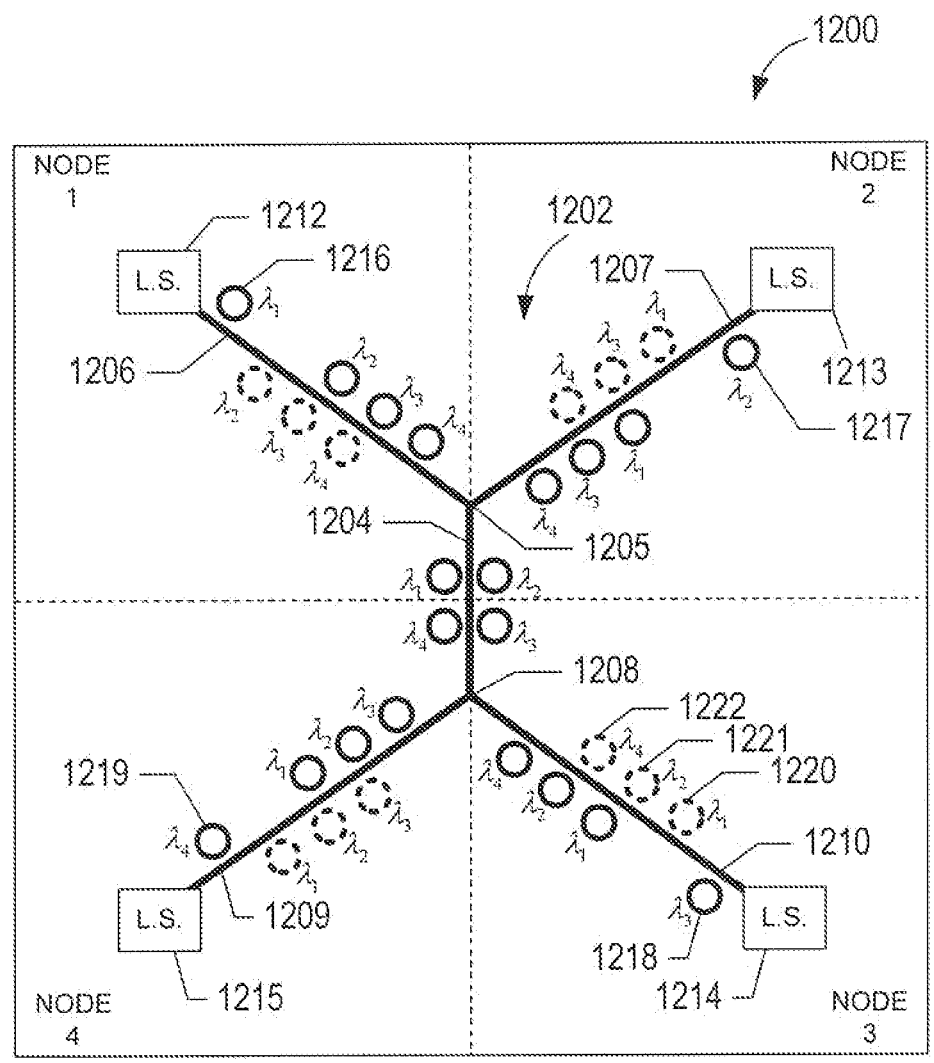
FIGS. 12A-12B show a top-plan view and operation of an example optical device layer.

FIG. 12A shows an example optical device layer 1200 that can also be implemented in the system 700. Unlike the optical device layer 1100, the optical device layer 1200 enables at least one node to send optical signals simultaneously to other nodes. The optical device layer 1200 includes a waveguide network 1202 composed of a central waveguide 1204 that branches at a first branch point 1205 into waveguide branches 1206 and 1207 and branches at a second branch point 1208 into waveguide branches 1209 and 1210. The optical device layer 1200 includes four light sources 1212-1215, each light source generates a different channel. For example, light source 1212 generates a channel $\lambda_1$, light source 1213 generates a channel $\lambda_2$, light source 1214 generates a channel $\lambda_3$, and light source 1215 generates a channel $\lambda_4$. Optical device layer 1200 includes resonators and detectors that are labeled with the wavelength the resonator or detector is configured or operated to have resonance with. The resonators 1216-1219 are electronically connected to nodes 1-4 and each of these resonators modulates one of the channels output from an associated light source. For example, resonator 1216 modulates the channel $\lambda_1$ to encode data in an optical signal $\lambda_1$ and can be turned "on" when node 1 is not sending information to prevent the channel $\lambda_1$ from entering the remainder of the waveguide network 1200. The optical device layer 1200 includes detectors electronically connected to each node so that each node can receive optical signals sent from the other nodes. For example, detectors 1220-1222 are electronically connected to node 3. Detector 1220 extracts an optical signal $\lambda_1$, detector 1221 extracts an optical signal $\lambda_2$, and detector 1222 extracts an optical signal $\lambda_3$. The optical device layer also includes a number of resonators to control the path of the optical signals sent over the waveguide network 1202 now described with reference to FIG. 12B.

Figure 12B:
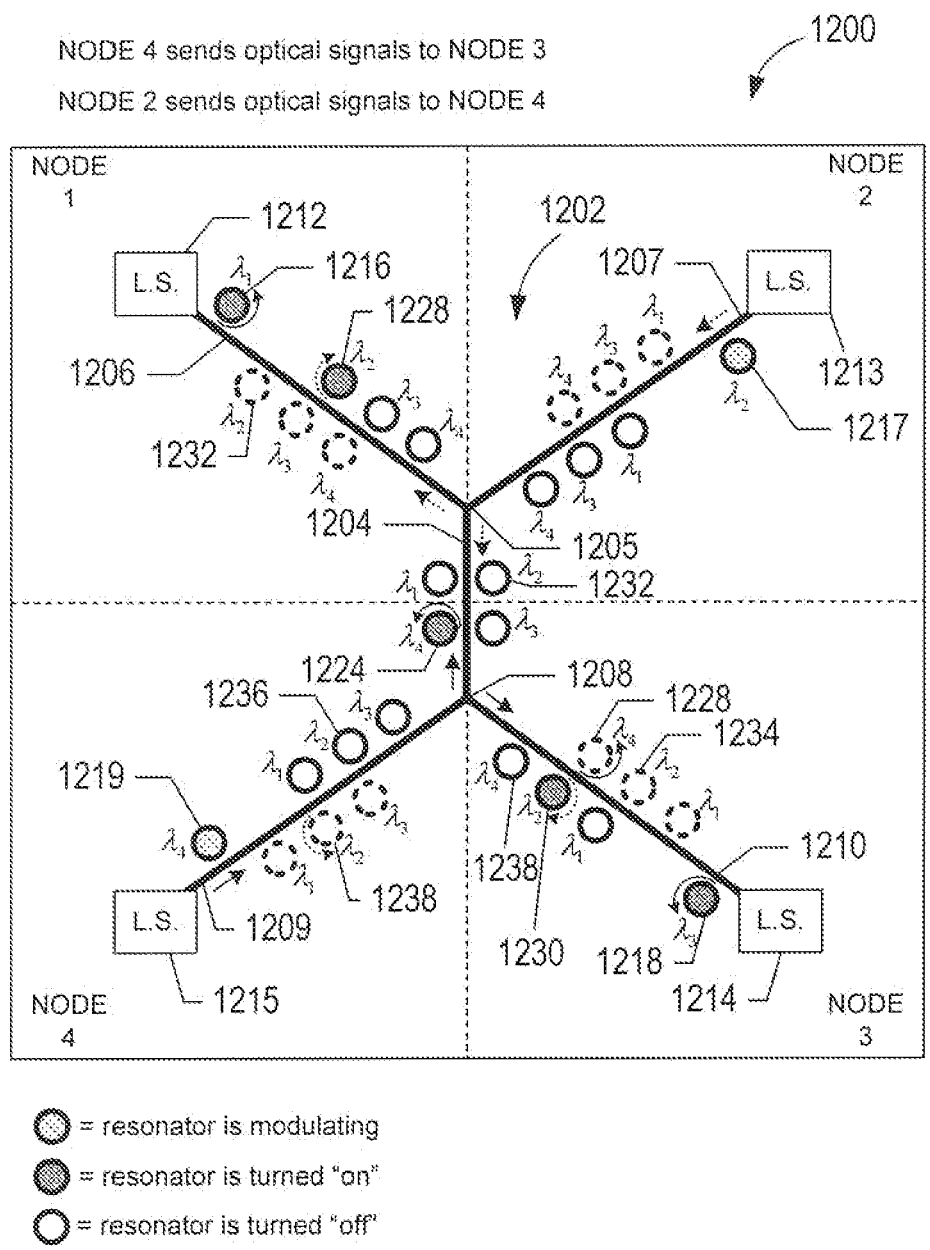

FIG. 12B shows a top-plan view of the optical device layer 1200 operated so that node 4 can be a sending node that exclusively sends optical signals to node 3 and node 2 can also be a sending node that simultaneously and exclusively sends optical signals to node 4. In this example, node 4 is a sending and a receiving node. As shown in the example of FIG. 12B, because nodes 1 and 3 are not sending optical signals, resonators 1216 and 1218 are turned "on" to prevent channels generated by light sources 1212 and 1214 from entering the waveguide network 1202. Node 4 operates the resonator 1219 to modulate the channel $\lambda_4$ and generate optical signal as described above with reference to FIG. 9B. At branch point 1208, the optical signal $\lambda_4$ is split and enters waveguides 1204 and 1210 with approximately the same optical power. Because the optical signal $\lambda_4$ is being sent to node 3, resonator 1224 is turned "on" to extract the optical signal $\lambda_4$ from the waveguide 1204 and prevent the optical signal $\lambda_4$ from reaching the waveguides 1206 and 1207. Resonator 1226 is turned "off" so the optical signal $\lambda_4$ can be extracted by detector 1228. On the other hand, node 2 operates the resonator 1217 to modulate the channel $\lambda_2$ and generate optical signal $\lambda_2$, as described above with reference to FIG. 9B. At branch point 1205, the optical signal $\lambda_2$ is split and enters waveguides 1204 and 1206 with approximately the same optical power. Resonator 1232 is turned "off" so optical signal $\lambda_2$ is split and enters waveguides 1209 and 1210. Because the optical signal $\lambda_2$ is being sent to node 4, resonators 1228 and 1230 are turned "on" to extract the optical signal $\lambda_2$ from the waveguides 1206 and 1210 and prevent the optical signal $\lambda_2$ from reaching the detectors 1232 and 1234. Resonator 1236 is turned "off" so the optical signal $\lambda_2$ can be extracted by detector 1238.

Figure 13:
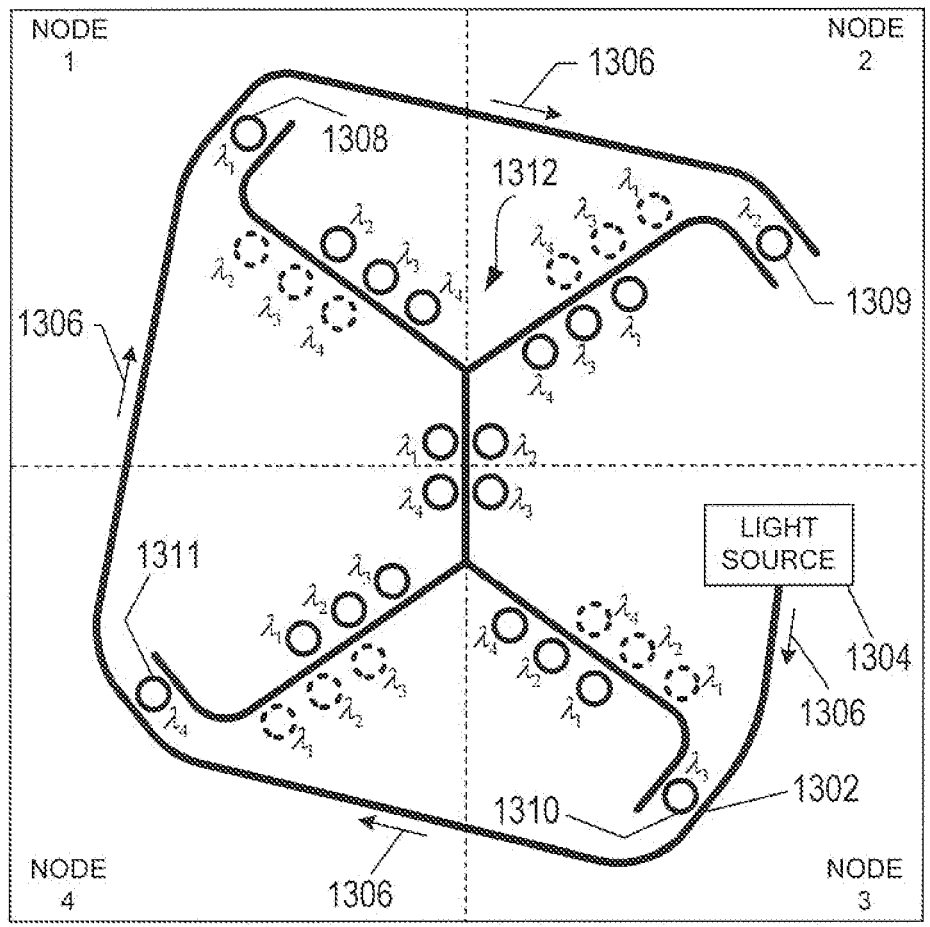
FIG. 13 shows a top-plan view of an example optical device layer.

Rather than each node having an associated light source in the optical device layer 1200, a single light source can be used to generate the separate channels. FIG. 13 shows a third example optical device layer 1300 that can be implemented in the system 700. The optical device layer 1300 is similar to the optical device layer 1200 except the optical device layer 1300 includes a power waveguide 1302 and a single light source 1304. The light source 1304 generates the four channels $\lambda_1$, $\lambda_2$, $\lambda_3$, and $\lambda_4$ that traverse the power waveguide 1302 in the same direction indicated by directional arrows 1306. Resonators 1308-1311 each modulate one of the four channels to generated optical signals that enter waveguide network 1312 as described above with reference to the optical device layer 1100. Waveguide network 1312 and the resonators and detectors can be operated in the same manner as the resonators and detectors of the optical device layer 1200.

Optical device layers are not limited to implementations with multi-node chips composed of just four nodes. Optical device layers can be implemented on multi-node chips composed of any number of nodes, and optical device layers can also be used to provide transmission of optical signals between various kinds of multi-node systems. For example, the waveguide network of an optical device layer can also be implemented with optical fibers that optically connect servers in a server rack, connect server racks, or connect buildings. For the sake of simplicity and convenience of describing the optical device layers, only eight of the nodes of a system are show and the nodes are shown as separate devices located at the ends of the waveguides comprising the waveguide network of the optical device layer. In practice, the nodes can have any suitable arrangement.

Figure 14:
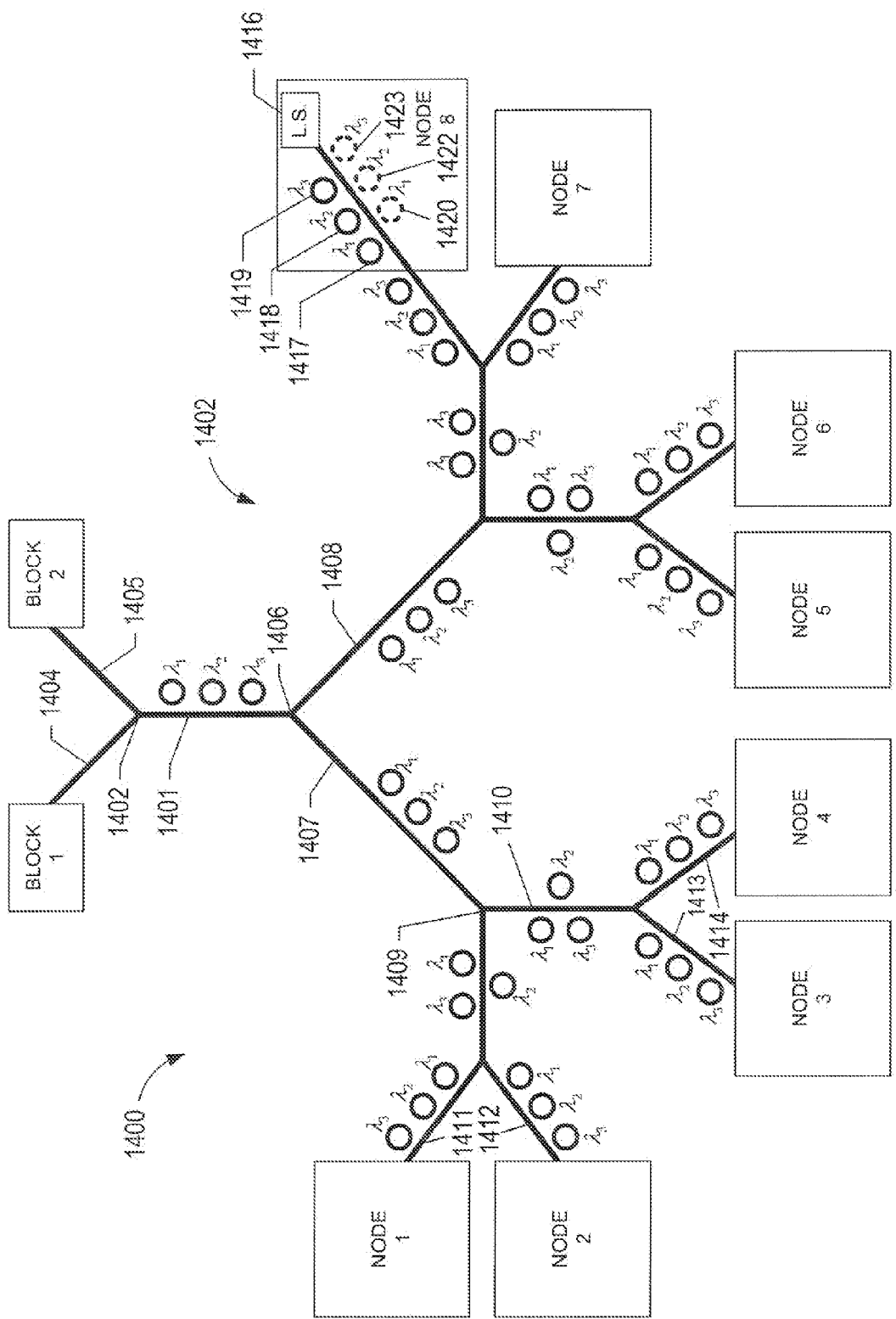
FIG. 14 shows a schematic representation of an example optical device layer.

FIG. 14 shows a schematic representation of an example optical device layer 1400. The optical device layer 1400 includes a waveguide network 1402 that enables each node to send optical signals to the other nodes. The waveguide network 1402 is composed of a central waveguide 1401 that branches at a first branch point 1402 into waveguide branches 1404 and 1405 and branches at a second branch point 1406 into waveguide branches 1407 and 1408. The waveguide 1407 branches into waveguides 1409 and 1410, where the waveguide 1409 branches into waveguide branches 1411 and 1412 that terminate at nodes 1 and 2, respectively, and the waveguide 1410 branches into waveguide branches 1413 and 1414 that terminate at nodes 3 and 4, respectively. As shown in FIG. 14, the waveguide 1408 similarly branches into waveguides that terminate at nodes 5-8. For the sake of simplicity and convenience, the waveguides branching from the waveguide 1404 and terminating at nodes comprising block 1 and the waveguides branching from the waveguide 1405 and terminating at nodes comprising block 2 are not shown. The waveguide network 1402 provides a network of waveguide branches that optically connect the nodes. In the example of FIG. 14, the optical device layer 1402 includes resonators located near the waveguides and labeled with the wavelengths $\lambda_1$, $\lambda_2$, and $\lambda_3$ for controlling the paths of optical signals encoded in the channels $\lambda_1$, $\lambda_2$ and $\lambda_3$, as described below with reference to FIG. 16. The branch points of the waveguide network 1402 can include 50:50 waveguide couplers that split the optical power associate with each channel entering a branch point so that approximately ½ of the optical power enters a first waveguide branch and approximately ½ of the optical power enters a second waveguide branch.

In certain examples, the optical device layer 1400 can include a light source, resonators, and detectors associated with each node. For example, FIG. 14 shows a light source 1416, resonators 1417-1419, and detectors 1420-1422 associated with node 8. The resonators 1417-1419 and detectors 1420-1422 are electronically connected to node 8. The resonators 1417-1419 are individually operated to encode data generated by node 8 in the channels $\lambda_1$, $\lambda_2$, and $\lambda_3$, as described above with reference to FIG. 12. Light source, resonators, and detectors associated with each of the remaining nodes are not shown in FIG. 14 for the sake of convenience.

Figure 15A:
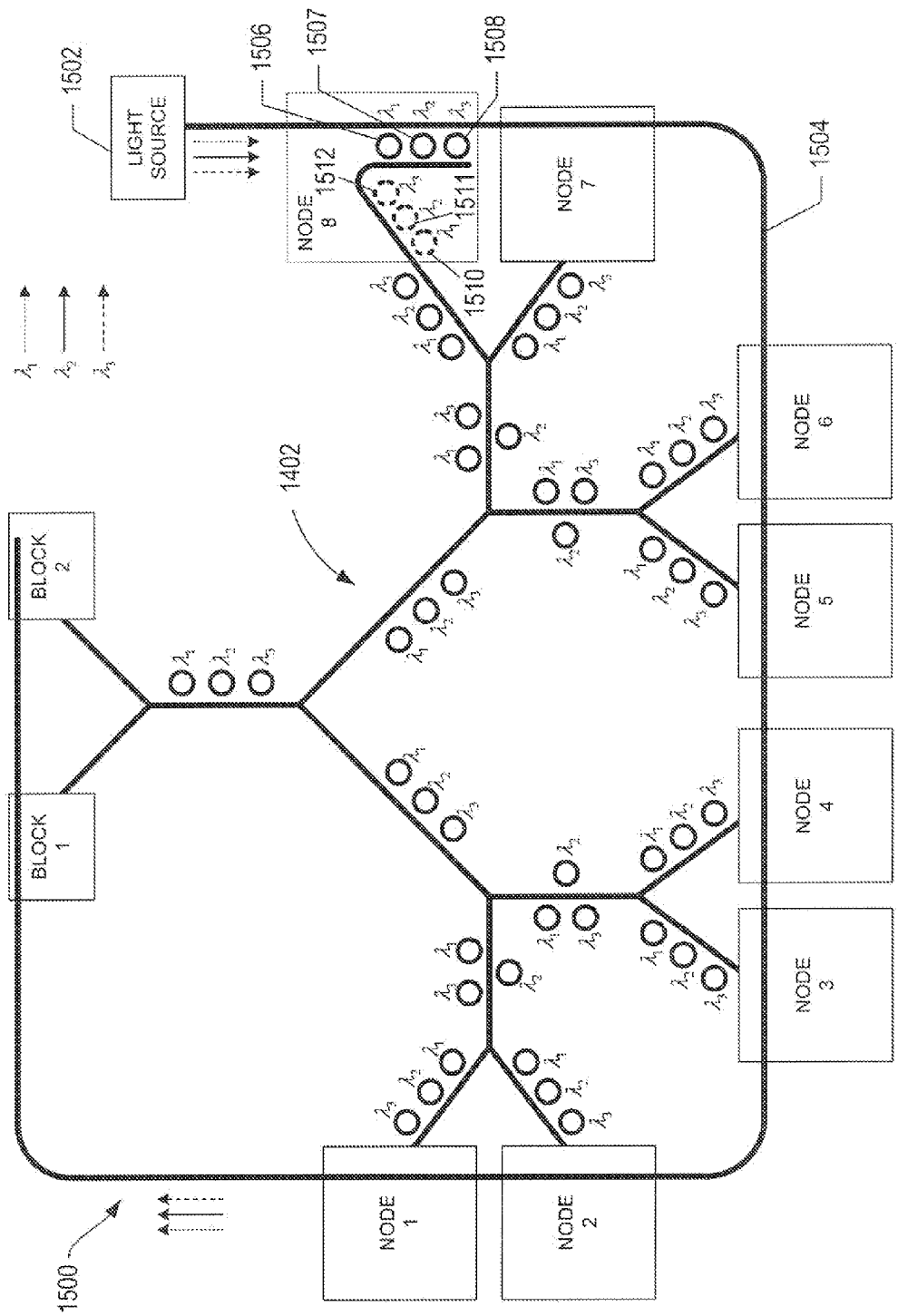
FIGS. 15A-15B show schematic representations of example optical device layers.

Rather than the optical device layer 1400 including multiple light sources, each of which is associated with a node, optical device layers can include a single light source and a power waveguide that carries the channels generated by the light source past each of the nodes. FIG. 15A shows a schematic representation of an example optical device layer 1500. The optical device layer 1500 is nearly identical to the optical device layer 1400 except the layer 1500 includes a single light source 1502 and a power waveguide 1504 optically coupled to the light source 1502. The light source 1502 generates the channels $\lambda_1$, $\lambda_2$, and $\lambda_3$ which are injected into the power waveguide 1504 and carried past each of the nodes. FIG. 15A shows resonators 1506-1508 and detectors 1510-1512 associated with node 8. The resonators 1506-1508 are electronically connected to node 8 and encode data in the channels $\lambda_1$, $\lambda_2$, and $\lambda_3$, as described above with reference to FIG. 13. The detectors 1510-1512 are also electronically connected to node 8 and can be electronically or thermally tuned in and out of resonance with the channels $\lambda_1$, $\lambda_2$, and $\lambda_3$ to avoid extracting optical signals generated by the resonators 1506-1508. Resonators and detectors associated with each of the remaining nodes are not shown in FIG. 15A for the sake of convenience.

Figure 15B:
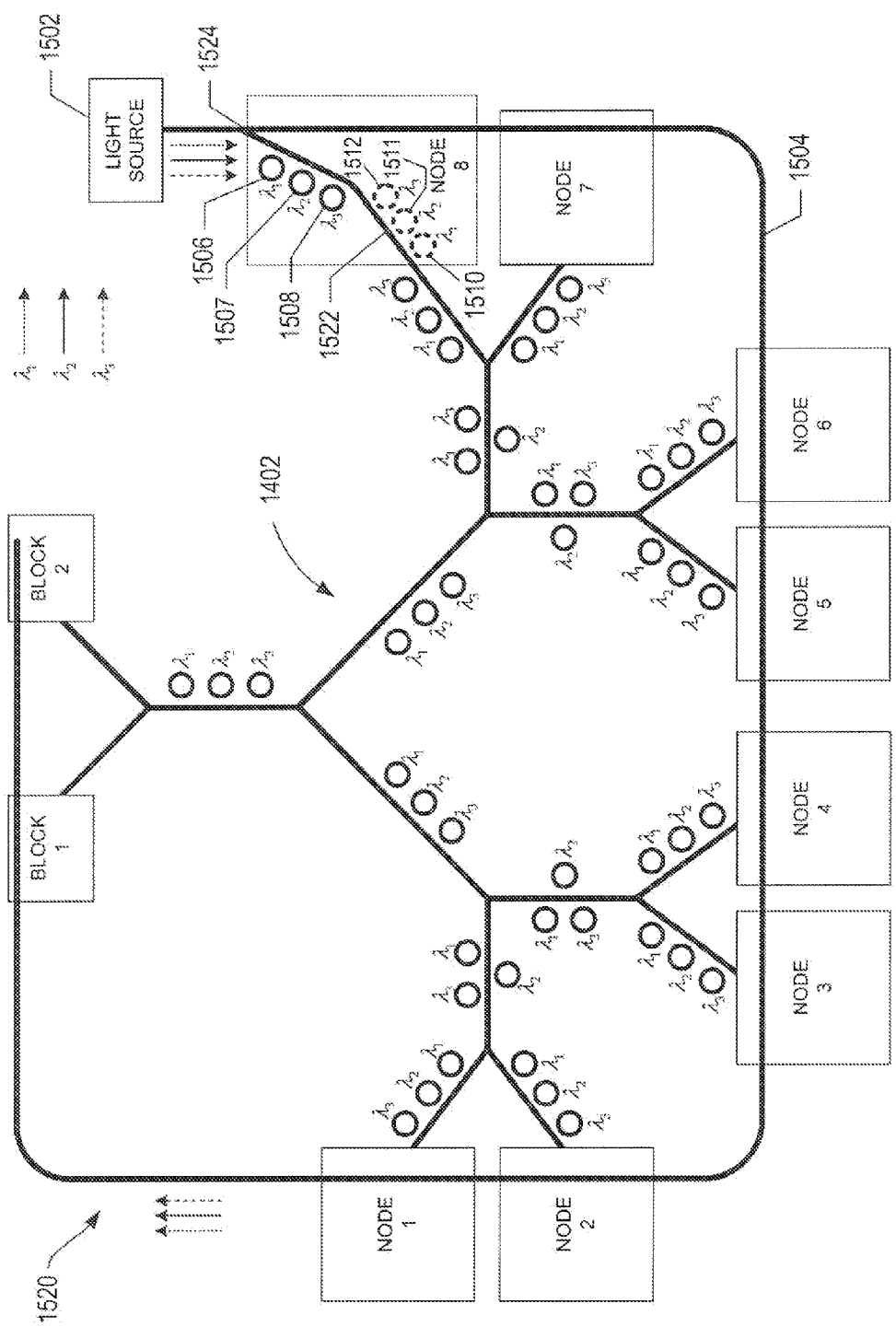

FIG. 15B shows a schematic representation of an example optical device layer 1520. The optical device layer 1520 is nearly identical to the optical device layer 1500 except the layer 1520 optical taps that divert a portion of the optical power associated with each channel to each of the nodes. As shown in the Example of FIG. 15B, the waveguide 1522 is optical connected to the power waveguide 1504 via an optical tap 1524. The light source 1502 generates the channels $\lambda_1$, $\lambda_2$ and $\lambda_3$ which are injected into the power waveguide 1504. The optical tap 1524 diverts a portion of each of the channels $\lambda_1$, $\lambda_2$, and $\lambda_3$ into the waveguide 1522. FIG. 15B shows the resonators 1506-1508 and detectors 1510-1512 associated with node 8. The optical taps associated with each of nodes are configured to divert the channel $\lambda_1$, $\lambda_2$, and $\lambda_3$ into end waveguides of the waveguide network 1402 with approximately the same optical power. For example, the light source 1502 can output each channel into the power waveguide 1504 with an optical power denoted by P. The optical taps located along the power waveguide 1504 are configured so that each node receives a diverted portion of the channels with approximately the same optical power of P/n, where n represents the number of nodes optically connected to the power waveguide 1504. The optical taps direct a fraction of each channel power to an optically connected node in accordance with:

$$R_m \approx \frac{1}{(n-m+1)}$$

and transmit a fraction of the channel power on the power waveguide 1504 in accordance with:

$$T_m \approx \frac{(n-m)}{(n-m+1)}$$

where m is an integer ranging from 1 to n. Thus, an optical tap receives a channel and directs a portion with optical power $PR_m$ toward an optically connected node and outputs a transmitted portion with optical power $PT_m$, where $P=PR_m+PT_m+L_m$ with $L_m$ representing the optical power loss at the optical tap due to absorption, scattering, or misalignment. The resonators 1506-1508 are electronically connected to node 8 and encode data in the channels $\lambda_1$, $\lambda_2$ and $\lambda_3$, as described above with reference to FIG. 14. The detectors 1510-1512 are also electronically connected to node 8 and can be electronically or thermally tuned in and out of resonance with the channels $\lambda_1$, $\lambda_2$, and $\lambda_3$ to avoid extracting optical signals generated by the resonators 1506-1508. Resonators and detectors associated with each of the remaining nodes are not shown in FIG. 15A for the sake of convenience.

Alternatively, the optical device layers 1500 and 1510 can be implemented with two, three, or four separate light sources and associated power waveguides. Each light source and power waveguide can be used to generate and provide the channels $\lambda_1$, $\lambda_2$, and $\lambda_3$ to the nodes for encoding optical signals. For example, the power waveguide 1504 can be shortened to provide the channels $\lambda_1$, $\lambda_2$, and $\lambda_3$ generated by the light source 1502 to just nodes 5-8. A second power waveguide can be used to provide the channels $\lambda_1$, $\lambda_2$, and $\lambda_3$ generated by a second light source to nodes 1-4. Blocks 1 and 2 can also include separate power waveguides and light sources to provide the channels $\lambda_1$, $\lambda_2$, and $\lambda_3$ to associated nodes.

Figure 16A:
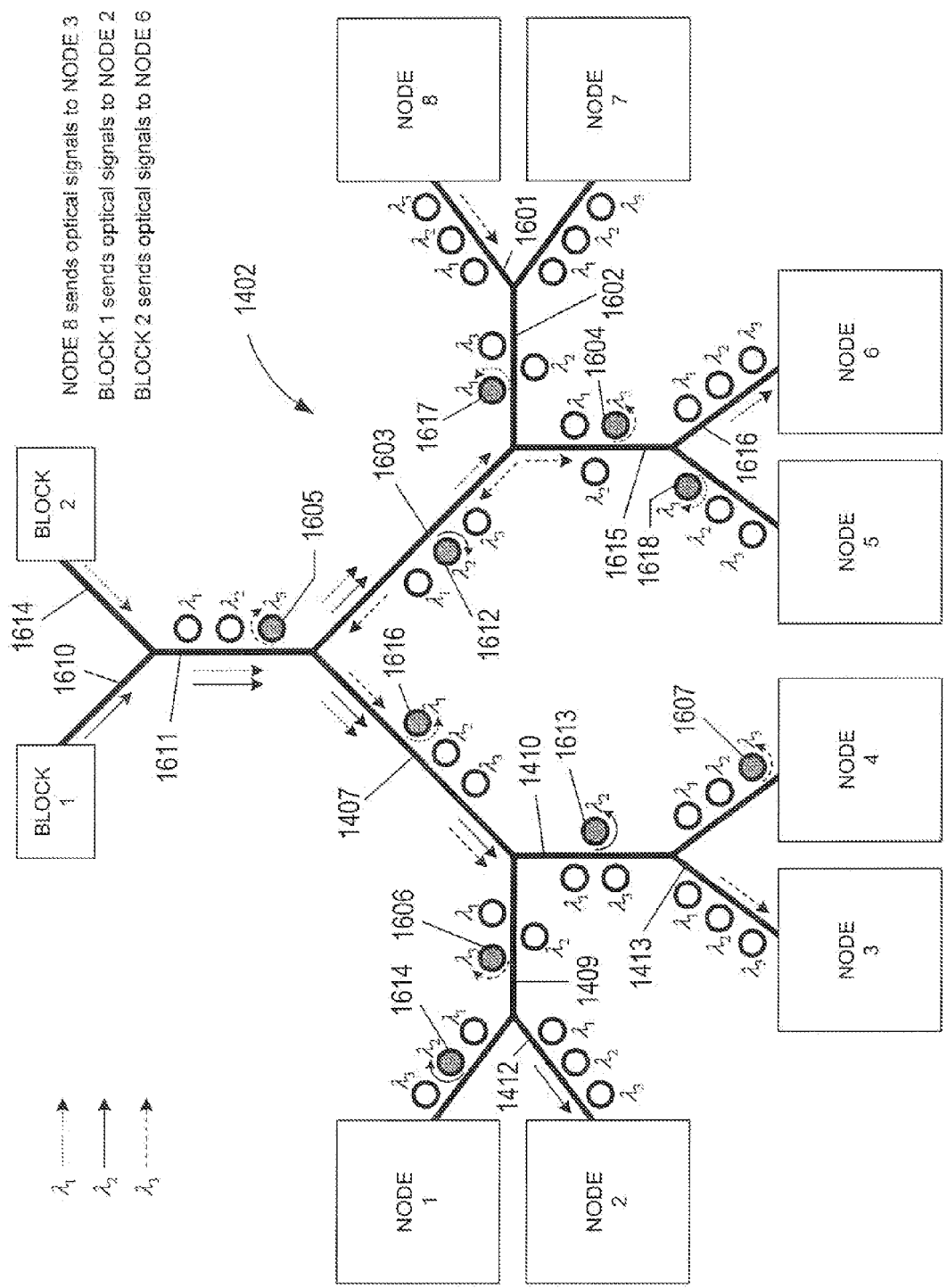
FIGS. 16A-16B show operations of an example optical device layer.
Figure 16B:
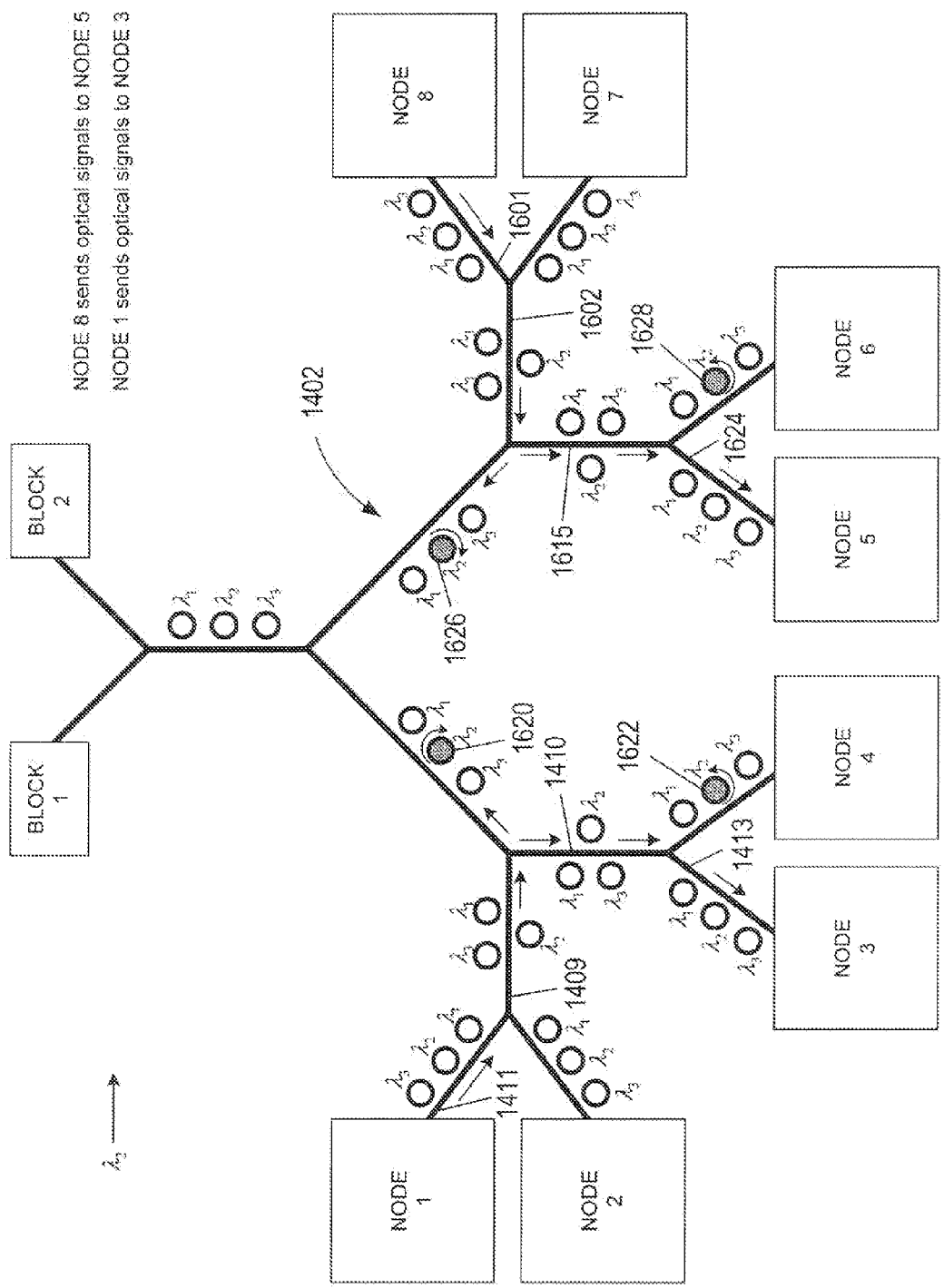

FIGS. 16A-16B show example operations of the waveguide network 1402 and resonators used to control the path of optical signals transmitted through the waveguide network 1402. The controller 706 (not shown in FIGS. 14-16) controls operation of the resonators and carries out arbitration of the channels $\lambda_1$, $\lambda_2$, and $\lambda_3$.

In the example of FIG. 16A, only three nodes are permitted to use the channels $\lambda_1$, $\lambda_2$, and $\lambda_3$ to simultaneously send optical signals to other nodes in the multi-node chip. Node 8 sends an optical signal encoded in the channel $\lambda_3$ to node 3, a node in block 1 sends an optical signal encoded in the channel $\lambda_3$ to node 2, and a node in block 2 sends an optical signal encoded in the channel $\lambda_1$ to node 6. The optical signal $\lambda_3$ generated by node 8 traverses waveguides 1601-1603, 1407, 1410, and 1413 to reach node 3. Resonators 1604-1607 are turned "on" to extract and prevent the optical signal $\lambda_3$ from reaching nodes other than node 3. The optical signal $\lambda_2$ generated by a node in block 1 traverses waveguides 1610, 1611, 1407, 1409, and 1412 to reach node 2. Resonators 1612-1614 are turned "on" to extract and prevent the optical signal $\lambda_2$ from reaching nodes other than node 2. The optical signal $\lambda_1$ generated by a node in block 2 traverses waveguides 1614, 1611, 1603, 1615, and 1616 to reach node 6. Resonators 1616-1618 are turned "on" to extract and prevent the optical signal $\lambda_1$ from reaching nodes other than node 6.

In the Example of FIG. 16B, two nodes are permitted to use the same channel $\lambda_2$ to simultaneously or in parallel send optical signals to other nodes in the multi-node chip, increasing aggregate bandwidth. Node 1 generates a first optical signal encoded in the channel $\lambda_2$ that is sent along waveguides 1411, 1409, 1410 and 1413 to node 3 by turning "on" resonators 1620 and 1622. Node 8 generates a second optical signal encoded in the same channel $\lambda_2$ that is sent along waveguides 1601, 1602, 1615, and 1624 to node 5 by turning "on" resonators 1626 and 1628. FIG. 16B demonstrates that appropriate use of resonators and the waveguide network 1402 enables at least two nodes to use the same channel to send optical signals to other nodes provided the optical signals do not traverse the same waveguides of the waveguide network 1402. Note that while nodes 1 and 8 are sending optical signals to nodes 3 and 5, respectively, other nodes in the multi-node chip can use the channels $\lambda_1$ and $\lambda_3$ to send optical signals that share the same waveguides as the first and second optical signals.

Figure 17:
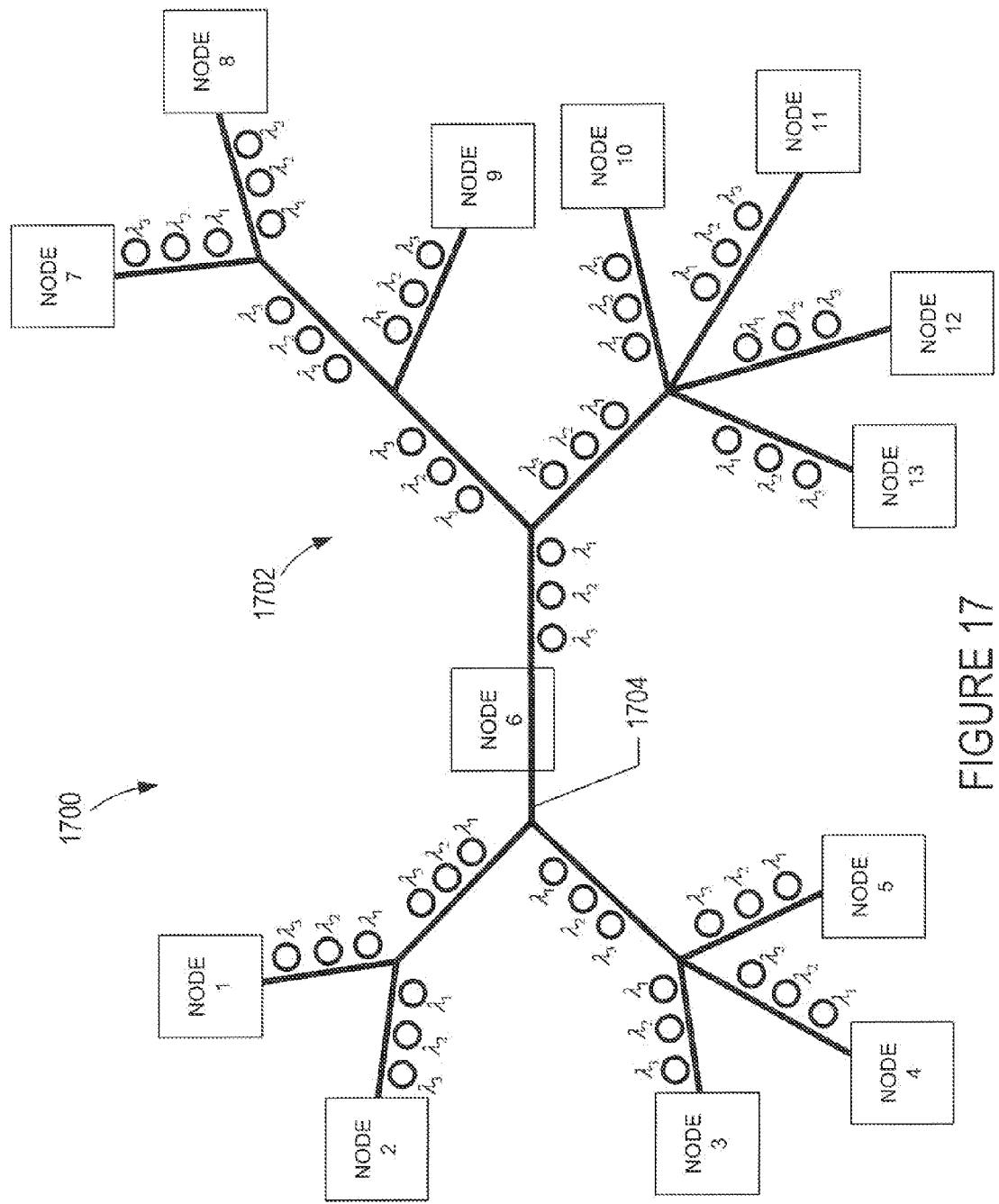
FIG. 17 shows an example of an asymmetrical waveguide network of an optical device layer.

For the sake of simplicity, the example waveguide networks described above have a symmetric structure, but optical device layer embodiments are not intended to be so limited. The waveguide networks can in practice be asymmetrical. FIG. 17 shows an example of an asymmetrical waveguide network 1702 of an optical device layer 1700. The waveguide network 1702 provides optical communication between thirteen nodes, twelve of which are located at the ends of the waveguide branches and a node 6 located along waveguide branch 1704. Like the example optical device 1400, the optical device layer 1700 includes resonators located near the waveguides and labeled with the wavelengths $\lambda_1$, $\lambda_2$, and $\lambda_3$ for controlling the paths of optical signals encoded in the channels $\lambda_1$, $\lambda_2$, and $\lambda_3$, as described above with reference to FIG. 16. The channels $\lambda_1$, $\lambda_2$, and $\lambda_3$ can be injected into the network of waveguides as described above with reference to FIGS. 14-15.

Rather than the nodes being located at the ends of the waveguides, in certain examples the optical device layer can include at least one waveguide that passes a number of nodes of a multi-node chip. Optical signals encoding data in the same channel can be injected into the same waveguide and travel in opposite directions provided the optical signals do not overlap on the waveguide. FIGS. 18A-18B show a first example of a waveguide 1802 of an optical device layer. The waveguide 1802 can represent a series of waveguide branches connected at branch points of a waveguide network and correspond to a path for optical signals sent in opposite directions. The optical device layer includes resonators and detectors located along the waveguide 1802. The resonators and detectors are electronically connected to nodes located along the waveguide 1802. The optical device layer 1800 may include other waveguides, resonators, and detectors not shown in FIGS. 18A-18B. In the example of FIG. 18A, node 1 operates a resonator 1804 to inject an optical signal 1806 that encodes data generated by node 1 in a channel into the waveguide 1802 in a first directions. The optical signal 1806 is extracted by a detector 1808 electronically connected to node 2. Farther along the waveguide 1802, node k+1 operates a resonator 1810 to inject an optical signal 1812 into the waveguide 1802 in a second direction, which is opposite the first direction. The detector 1814 electronically connected to node k+1 and configured to have resonance with the channel used to create the optical signal 1812 can be electronically or thermally tuned "off" resonance so the optical signal 1812 can pass the detector 1814 unperturbed and be extracted by a detector 1816 electronically connected to node k. In this example optical communication between nodes 1 and 2 and optical communication between nodes k and k+1 can continue in parallel while sharing the same waveguide 1802 and using the same channel because the detectors 1808 and 1816 effectively extract the optical signals 1806 and 1812 from the waveguide 1802 and prevent the optical signals from interfering. In the example of FIG. 18B, the same channel used by node 1 to send optical signals to node 2 is no longer used by node k+1 to send data to node k. Node 2 electronically or thermally tunes the detector 1808 "off" resonance and node k can extract the optical signal generated by node 1 using the detector 1816.

Resonators located along the waveguide can be used to prevent the optical signals from overlapping on the waveguide. FIGS. 19A-19B show a second example of a waveguide 1902 of an optical device layer 1900. The waveguide 1902 can represent a series of waveguide branches connected at branch points of a waveguide network and correspond to a path for optical signals sent in opposite directions. Like the optical device layer 1800, the optical device layer 1900 includes resonators and detectors located along the waveguide 1902. The resonators and detectors are electronically connected to nodes located along the waveguide 1902. In FIGS. 19A-19B channels are injected into opposite ends of the waveguide 1902. In the example of FIG. 19A, node 1 operates a resonator 1904 to create an optical signal 1906 traveling along the waveguide 1902 in a first direction. The optical signal 1906 is extracted by a detector 1908 electronically connected to node 2. Node 1 can electronically or thermally tune the detector 1910 "off" resonance with the channel of the optical signal 1906. Farther along the waveguide 1902, node k+1 operates a resonator 1912 to create an optical signal 1914 traveling in a second direction, which is opposite the first direction. The detector 1916 is electronically connected to node k+1 and can be electronically or thermally tuned "off" resonance so the optical signal 1914 can pass detector 1916 unperturbed to reach a detector 1918 electronically connected to node k. In this example, optical communication between nodes 1 and 2 and optical communication between nodes k and k+1 can continue in parallel while sharing the same waveguide 1902 because the detectors 1908 and 1918 effectively extract the optical signals 1906 and 1914 from the waveguide 1902. Blocking resonators 1920 located along the waveguide 1902 can be electronically connected to a controller and used to prevent optical signals encoded in the same channel from interfering on the waveguide 1902. In the example of FIG. 19B, the same channel used by node k+1 to send optical signals to node k is prevented from reaching node k by turning "on" the blocking resonator 1920. Node 2 electronically or thermally tunes the detector 1908 "off" resonance and node k can extract the optical signal generated by node 1 using the detector 1918.

Although various example optical device layers are described above as being implemented with microring resonators, microring detectors, and ridge waveguides, optical device layers are not intended to be so limited. Optical device layers can also be implemented using photonic crystals and photonic crystal optical devices. For example, ridge waveguides can be replaced with photonic crystal waveguides, and the microring resonators and microring detectors can be replaced with pn and p-i-n junction resonant cavities.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An optical data path system comprising:
    an optical device layer connected to nodes of a multi-node system, the optical device layer including:
        a waveguide network of waveguide branches optically connecting each node of the multi-node system to every other node of the multi-node system,
        resonators disposed adjacent to the waveguide branches, and
        detectors disposed adjacent to waveguide branches of the waveguide network, each detector electronically connected to a node of the multi-node system; and
    a controller, wherein the resonators are electronically connected to and operated by the controller to control the path of optical signals sent between the nodes of the multi-node system.

2. The system of claim 1, wherein the optical device layer further comprises
    at least one light source, each light source generates at least one channel;
    at least one power waveguide, each power waveguide optically coupled to one of the light sources and carries the at least one channel past at least one node; and
    resonators disposed adjacent to the waveguide branches, each resonator electronically connected to a node, wherein each node operates a resonator to extract portions of a channel carried by a power waveguide and injects the portions into a waveguide branch to create an optical signal carried by the waveguide network to at least one node of the multi-node system.

3. The system of claim 1, wherein the optical device layer further comprises
    at least one light source, wherein each light source is optically coupled to an end waveguide branch of the waveguide network and generates at least one channel; and
    at least one resonator electronically connected to at least one node and located adjacent to an end waveguide branch, wherein each node operates at least one resonator to modulate at least one channel injected into an end waveguide branch to produce at least one optical signal carried by the waveguide network to at least one node of the multi-node system.

4. The system of claim 1, wherein the optical signals sent between nodes further comprises the optical signals encoded in different channels such that the optical signals are sent between nodes in parallel.

5. The system of claim 1, wherein the resonators are operated by the controller to control the path of optical signals sent between the nodes further comprises tunable resonators that are switched by the controller into and out of resonance with the channel of an optical signal.

6. The system of claim 1, wherein the detectors further comprises tunable detectors electronically connected to the controller, wherein each tunable detector is switched in and out of resonance with the channel used by an electronically connected node to create an optical signal.

7. The system of claim 1, wherein the waveguide network further comprises optical fibers or ridge waveguides.

8. The system of claim 1, wherein the controller further comprises arbitration to mediate access of each node over the waveguide network.

9. The system of claim 1, wherein the resonators further comprise microring resonators and the detectors further comprise microring detectors.

10. The system of claim 1, wherein the controller provides for communication from any one node to any other node within the multi-node system.

11. An optical device layer for establishing optical communication between nodes of a multi-node system comprising:
    a waveguide located in proximity to each node of the multi-node system;
    resonators disposed adjacent to the waveguide, each resonator electronically connected to a node of the multi-node system to encode optical signals in a channel carried by the waveguide; and
    detectors disposed adjacent to the waveguide, each detector electronically connected to a node of the multi-node system to extract an optical signal encoded in a channel from the waveguide to prevent the channel from interfering with an optical signal encoded in the same channel sent on the waveguide in the opposite direction.

12. The device of claim 11, further comprising blocking resonators disposed adjacent to the waveguide, each blocking resonator electronically connected to a controller, wherein the controller tunes the blocking resonator into resonance with the channel to extract the channel from the waveguide.

13. The device of claim 11, wherein the wave guide further comprises a series of branch waveguides connected at branch points of a waveguide network.

14. The device of claim 11, wherein the detectors further comprise tunable detectors electronically connected to the controller, wherein each tunable detector is switched in and out of resonance with an optical signal encoded in a channel.

15. The device of claim 11, wherein the resonators further comprise microring resonators and the detectors further comprise microring detectors.

16. The device of claim 11, wherein the waveguide further comprises a ridge waveguide.

17. A method for controlling passage of optical signals sent between nodes of a multi-node system, the method comprising:
- placing an optical signal encoded in a channel into a waveguide network, the optical signal generated by a sending node of the multi-node system, wherein the waveguide network optically connects each node in the multi-node system to all the other nodes in the multi-node system;
- with a controller, selectively tuning resonators located along waveguide branches of the waveguide network into resonance with the channel to extract the optical signal from certain waveguide branches and prevent the optical signal from propagating along waveguide branches leading to non-receiving nodes, said controller selectively routing an optical signal from any node in the multi-node system to any other node, as a receiving node, in the multi-node system; and
- extracting the optical signal from waveguide branches at detectors that convert the optical signal into electrical signals for processing by the at least one receiving node.

18. The method of claim 17, wherein placing the optical signal into the waveguide network further comprises modulating the channel injected into an end waveguide branch of the waveguide network using a resonator disposed adjacent to the end waveguide branch and operated by the sending node.

19. The method of claim 17, wherein placing the optical signal into the waveguide network further comprises extracting portions of the channel from a power waveguide and injecting the portions into a waveguide branch of the waveguide network using a resonator disposed between the waveguide branch and the power waveguide, the resonator operated by the sending node.

20. The method of claim 17, wherein tuning resonators located along the waveguide branches into resonance with the channel further comprises at least one of
- thermally tuning the resonators into resonance with the channel; and
- electronically tuning the resonators into resonance with the channel.

* * * * *

UNITED STATES PATENT AND TRADEMARK OFFICE
CERTIFICATE OF CORRECTION

PATENT NO. : 8,472,808 B2  
APPLICATION NO. : 12/898798  
DATED : June 25, 2013  
INVENTOR(S) : David A. Roberts et al.

Page 1 of 1

It is certified that error appears in the above-identified patent and that said Letters Patent is hereby corrected as shown below:

In the Claims

In column 16, line 61, in Claim 13, delete "wave guide" and insert -- waveguide --, therefor.

Signed and Sealed this
Twenty-ninth Day of October, 2013

Teresa Stanek Rea
*Deputy Director of the United States Patent and Trademark Office*